United States Patent
Ravichandran

(10) Patent No.: US 12,516,079 B2
(45) Date of Patent: Jan. 6, 2026

(54) SILANE FUNCTIONAL STABILIZERS FOR EXTENDING LONG-TERM ELECTRICAL POWER CABLE PERFORMANCE

(71) Applicant: Southwire Company, LLC, Carrollton, GA (US)

(72) Inventor: Ramanathan Ravichandran, Suffern, NY (US)

(73) Assignee: Southwire Company, LLC, Carrollton, GA (US)

(*) Notice: Subject to any disclaimer, the term of this patent is extended or adjusted under 35 U.S.C. 154(b) by 155 days.

(21) Appl. No.: 18/408,396

(22) Filed: Jan. 9, 2024

(65) Prior Publication Data
US 2024/0254154 A1    Aug. 1, 2024

Related U.S. Application Data

(60) Provisional application No. 63/438,214, filed on Jan. 10, 2023.

(51) Int. Cl.
*C07F 17/02*   (2006.01)
*H01B 3/46*   (2006.01)
*H01B 13/32*   (2006.01)

(52) U.S. Cl.
CPC ............ *C07F 17/02* (2013.01); *H01B 3/46* (2013.01); *H01B 13/322* (2013.01)

(58) Field of Classification Search
CPC .......... C07F 17/02; H01B 13/322; H01B 3/46
(Continued)

(56) References Cited

U.S. PATENT DOCUMENTS

| | | |
|---|---|---|
| 3,499,791 A | 3/1970 | Edwin |
| 3,795,646 A | 3/1974 | Wallace et al. |

(Continued)

FOREIGN PATENT DOCUMENTS

| | | | |
|---|---|---|---|
| DE | 3017442 A1 | 11/1981 | |
| EP | 0388321 A1 | 9/1990 | |
| JP | 2004231579 A | * 8/2004 | ............ C07F 17/02 |

OTHER PUBLICATIONS

Metallocene—Wikipedia Sep. 2022.*
(Continued)

*Primary Examiner* — Timothy J Thompson
*Assistant Examiner* — Guillermo J Egoavil
(74) *Attorney, Agent, or Firm* — Barry L. Davison; Davis Wright Tremaine LLP

(57) ABSTRACT

Provided are unique acyl metallocene compounds of formula (1):

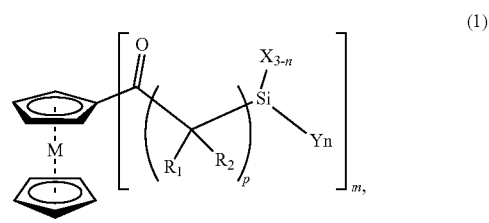

as defined herein. Additionally provided are dielectric enhancement fluids and hydrosilylation gel compositions, in either case comprising at least one acyl metallocene compound of formula (1). Further provided are methods for extending the useful life of an insulated cable, comprising injecting the dielectric enhancement fluids or the hydrosi- (Continued)

lylation gel compositions into the cable, wherein the acyl metallocene compound of formula (1) diffuses into the polymeric insulation. Yet further provided are methods for extending the useful life of in-service electrical cable, comprising injecting the dielectric enhancement fluid compositions into the cable, wherein the injected composition provides for both initial permeation of the acyl metallocene compound of formula (1) into the polymeric insulation, and extended retention of subsequent condensation products of the acyl metallocene compound of formula (1) in the cable insulation.

24 Claims, 4 Drawing Sheets

(58) Field of Classification Search
USPC ...................................................... 174/137 B
See application file for complete search history.

(56) References Cited

U.S. PATENT DOCUMENTS

| | | | |
|---|---|---|---|
| 3,956,420 | A | 5/1976 | Kato et al. |
| 4,206,260 | A | 6/1980 | McMahon |
| 4,766,011 | A | 8/1988 | Vincent et al. |
| 4,870,121 | A | 9/1989 | Bamji et al. |
| 4,895,885 | A | 1/1990 | Foster et al. |
| 4,921,962 | A | 5/1990 | Galbo et al. |
| 4,946,880 | A | 8/1990 | Costanzi et al. |
| 4,978,694 | A | 12/1990 | Vincent et al. |
| 5,021,481 | A | 6/1991 | Galbo et al. |
| 5,051,458 | A | 9/1991 | Costanzi et al. |
| 5,372,840 | A | 12/1994 | Kleyer et al. |
| 5,372,841 | A | 12/1994 | Kleyer et al. |
| 5,719,218 | A | 2/1998 | Sarma |
| 6,162,491 | A | 12/2000 | Bertini |
| 7,683,260 | B2 | 3/2010 | Bertini et al. |
| 7,700,871 | B2 | 4/2010 | Bertini et al. |
| 8,101,034 | B2 | 1/2012 | Bertini et al. |
| 8,572,842 | B2 | 11/2013 | Bertini et al. |
| 11,749,422 | B2 | 9/2023 | Bertini et al. |
| 2006/0210897 | A1* | 9/2006 | Jubran ................ G03G 5/0609 430/58.35 |
| 2014/0004359 | A1 | 1/2014 | Marrot et al. |
| 2018/0363940 | A1 | 12/2018 | Bertini et al. |
| 2021/0292345 | A1* | 9/2021 | Chauvier ................ C07F 7/188 |

OTHER PUBLICATIONS

Benzoyl-Substituted Ferrocenes_Kutal et al_1152 to1156_Dec. 1999.*
Acetylferrocene_Wikipedia_Oct. 2022.*
Bringing New Chemistry to Life_Arnold_4143 to 4148_2018.*
Silicon as a Building Block for Life_Petkowski et al_1 to 47_Jun. 2020.*
Siloxane Coordination Revisited Si O Bond Character_Dankert et al_2907 to 2927_2021.*
Organosilane Protecting Groups_Gelest_1 to 4_Jan. 2022.*
Van Deursen et al, "AC Induced Corrosion of Low Voltage Power Cables with Aluminum Conductors," NACE International Corrosion Conference & Expo, Apr. 15, 2018, 11 pages.
Bauer et al., "Osmium Compounds," Compounds of Transition Metals, 1975, 2 pages.
Bertini, "Accelerated Aging of Rejuvenated Cables—Part I," ICC, Subcommittee A, Apr. 19, 2005, 5 pages.
Bertini, "Cable Rejuvenation Mechanisms," IEEE/ICC, Sub, 2006, 8 pages.
Ghosh et al., "Studies on Aluminized, High Burning Rate, Butacene@ Based, Composite Propellants," Central Europe an Journal of Energetic Materials, 11(3): 2014, 12 pages.
International Search Report and Written Opinion for Application No. PCT/US2024/10945, mailed Apr. 17, 2024, filed Jan. 9, 2024, 9 pages.
Lewis et al., "The Chemistry of Fumarate and Maleate Inhibitors with Platinum Hydrosilylation Catalysts," Journal of Organometallic Chemistry, 521(1-2): Aug. 1996, 7 pages.
Rauf et al., Contemporary Developments in Ferrocene Chemistry: Physical, Chemical, Biological and Industrial Aspects, Molecules, Jul. 2023, 8 pages.
Teimuri-Mofrad et al., "Synthesis of Novel BIS[(tris(dimethylsily)methyl)alkyl] Ferrocene Derivatives as New Ferrocenyl Multi-Functional Silyl Ether Compounds," 2016, 14 pages.
Vukicevic et al., "Acylation of Ferrocene: A New Approach," Tetrahedron, 2002, 6 pages.

* cited by examiner

SILANE FUNCTIONAL STABILIZERS FOR EXTENDING LONG-TERM ELECTRICAL POWER CABLE PERFORMANCE

CROSS-REFERENCE TO RELATED APPLICATIONS

This application claims the benefit of U.S. Provisional Application No. 63/438,214, filed on Jan. 10, 2023, which is incorporated herein by reference in its entirety.

FIELD OF THE INVENTION

Aspects of the present invention relate generally to enhancing and extending the life of underground cable insulation, and particularly to unique silane functional acyl metallocene compound additives, including acyl ferrocene additives, and methods comprising injecting of fluids and gels containing the silane functional metallocene compounds as additives for enhancing and extending the life of underground cable insulation. The instant functional acyl metallocene additives, being compatible and soluble liquids, are readily incorporated into the fluid and gel formulations and retained longer term in the cable insulation, compared to the parent ferrocene.

BACKGROUND OF THE INVENTION

Extensive networks of underground electrical cables are in place in many parts of the industrialized world. Such underground distribution offers great advantage over conventional overhead lines in that it is not subject to wind, ice or lightning damage and is thus viewed as a reliable means for delivering electrical power without obstructing the surrounding landscape, the latter feature being particularly appreciated in suburban and urban settings. Unfortunately, these cables (which generally comprise a stranded conductor surrounded by a semi-conducting conductor shield, a polymeric insulation jacket, and an insulation shield), particularly those installed prior to 1995, often suffer premature breakdown and do not attain their originally anticipated longevity of 30 to 40 years.

For medium and high voltage cables, dielectric breakdown is generally attributed to so-called "treeing" phenomena (i.e., formation of microscopic dendritic structures within the insulation material, from which the descriptive terminology derives), which lead to a progressive degradation of the cable's dielectric strength.

Contrary to medium or high voltage cables, damage in the insulation of a low voltage cable, such as a distribution cable supplying a private home, which can result from improper installation, dig-ins, or insulation degradation due to external factors (thermal, ultraviolet (UV), chemical exposure), does not necessarily lead to failure of the connection. In medium- and high-voltage cable the electric field strength within the insulation will cause an immediate breakdown, whereas in low-voltage cable the damaged cable can still withstand the relatively low field and the cable remains operational. However, at the damaged location the conductor is exposed. Depending on the surrounding ground properties, different degradation mechanisms, such as corrosion, can occur. These mechanisms can eventually result in failure of the connection. (van Deursen, A.; Wouters, P.; Kruizinga, B.; Steennis, F. "AC Induced Corrosion of Low Voltage Power Cables with Aluminum Conductors", NACE International Corrosion Conference & Expo, 2018). Since replacing a failed section of underground cable can be a very expensive and involved procedure, there is a strong motivation on the part of the electrical utility industry to extend the useful life of existing underground cables in a cost-effective manner.

Underground electrical utilities also present fire and/or explosion hazards proximate to areas of human habitation. For example, while conduits provide passageways between vaults for interconnecting electrical cables, the conduits also allow air, gases, vapors, and water to enter the interiors of the vaults. It is not unusual for such underground vaults and conduits to fill with water depending on the surface topography, water table, and recent precipitation. Water also enters through the manhole cover. Water allows for electrochemical breakdown of the insulation to occur through tracking of cables in ducts (i.e., electrical discharge along degraded insulation) and electrical equipment failures inside one or more of the vaults, which produce hazardous concentrations of explosive and flammable gases therein. Because air can never be excluded entirely from a vault, manhole events may result. Manhole events include both minor incidents (such as smoke or small fires) and/or major events (such as sustained fires and explosions). At best, a minor incident is likely to cause an electrical power outage. At worst, a major event, such as an explosion, can occasionally propel a manhole cover skyward causing property damage, injuries, and even death (see e.g., U.S. Patent Application Publication No. 2018/0363940, by Bertini, Glen J.; Songras, Donald R.). While the referenced patent application proposes methods to avoid manhole events, reducing the number of underground cable failures will reduce their frequency.

A typical method for rejuvenating in-service medium and high-voltage power cables operating above about 1 kV comprises introducing a tree retardant fluid into the void space (interstitial void volume) associated with the strand conductor geometry. This fluid diffuses into the insulation and fills the microscopic trees thereby augmenting the service life of the cable. The fluid is generally selected from a specific class of alkoxysilanes which can oligomerize within the cable's interstitial void volume, as well as within the insulation (Vincent et al., in U.S. Pat. No. 4,766,011). This method and variations thereof employing certain rapidly diffusing components (U.S. Pat. Nos. 5,372,840 and 5,372,841) have enjoyed commercial success for more than two decades.

Alternatively, the problem of corrosion and tracking common in low-voltage power cable systems operating below about 1 kV has been attacked by excluding water from the cable's interior by filling the interstices of the cable conductor with a dielectric gel which effectively acts as a "water block." For example, see U.S. Pat. No. 4,978,694, issued to Vincent and Meyer and references therein. While gel filling of the cable prevents entry of water into the interstices and helps prevent corrosion of the conductors, it does not address degradation of the polymeric insulation of the cable.

All the current methods known to applicants, however, still do not deliver the full potential of insulation longevity. For tree-retardant fluids, this is very likely due to the diffusion of these compounds out of the cable within 10 to 15 years after treatment, thereby again exposing the cable to the above-mentioned treeing phenomena (e.g., see Bertini, "Accelerated Aging of Rejuvenated Cables-Part I," ICC, Sub. A, Apr. 19, 2005). For dielectric gels, the low voltage cable insulation does not receive additional protection against oxidation brought on by thermal, chemical or UV exposure that serve as points of water ingress. Thus, there is a continued desire on the part of the utility industry to further extend the reliable performance of treated cable, thereby improving efficiency, reducing operating costs, and improving safety.

Electrical-treeing phenomena which occur in polymers such as low-density polyethylene (LDPE),) crosslinked polyethylene (XLPE), and ethylene-propylene rubber (EPR) have been under study for many years. Proposed mechanisms to explain electrical treeing in insulation materials subjected to high electric fields are discussed in Bertini & Vincent, "Cable Rejuvenation Mechanisms", ICC, Sub. A, Mar. 14, 2006. The conclusion in that reference is that defects that are accidentally introduced into the polymer during cable manufacture become points of high local stress and reduce insulation performance. Such points of high electrical stress are usually simulated in the laboratory by molding needles into the polymer.

To overcome the problem of electrical treeing, several solutions have been proposed thus far. For instance, McMahon, U.S. Pat. No. 4,206,260, proposes using LDPE or XLPE insulation with an amount of an alcohol of 6 to 24 carbon atoms. Maloney, U.S. Pat. No. 3,499,791, discloses a polyethylene insulation containing an inorganic ionic salt of a strong acid and a strong zwitter-ion compound. Kato et al., U.S. Pat. No. 3,956,420, discloses insulation comprising a polyolefin, a ferrocene compound and a substituted quinoline compound. Additionally, a small amount of polyhydric alcohol, dispersant, surfactant or unsaturated polymer or mixture thereof is used. Mackenzie, Jr., U.S. Pat. No. 3,795,646, recommends the use of a silicone fluid in a crosslinked polyethylene composition.

Polymer additives such as antioxidants, UV absorbers and free radical scavengers like HALS (Hindered Amine Light Stabilizers) have been used in such cable insulation formulations to retard radical and UV induced degradation.

Prior art patents, such as Bertini et al., U.S. Pat. No. 8,101,034, also teach the use of several such additives to improve the long-term efficacy of restorative fluids resulting in the following benefits:
  a. Extended dwell time in the cable insulation;
  b. Being at least five times more soluble than water in polymeric insulation, these materials preferentially "wet" the insulation, thereby greatly reducing the rewetting of the insulation by water permeation;
  c. Additives augment the density of the dielectric enhancement fluid formulation in which they are incorporated, and this translates into an increased supply of total fluid mass to impart additional life-extension functionality into a given interstitial volume; and
  d. Chemical functionality can further extend the performance of the insulation polymer.

Examples of Such Additives Disclosed Include

Antioxidants such as hindered phenolic additives based on 2,6-di-tert-butyl phenol derived products. In addition to their function during the extrusion process, they also slow the growth of water trees. An example of antioxidants that are used include Irgastab® Cable KV10 (4,6-bis (octylthiomethyl)-o-cresol), sulfur containing product (CAS #110553-27-0) from BASF;
  Metallocenes wherein a metallic atom such as Fe, Mn, Ni, Co, Ru or Os is "sandwiched" between two cyclopentadienyl rings. Specific examples include ferrocene and derivatives thereof, such as n-butylferrocene and octanoyl ferrocene. Such components act as voltage stabilizers and UV absorbers;
Voltage stabilizers, such as 1,3-diketones (e.g., avobenzone), esters of acetoacetic acid (e.g., the ethyl ester or n-propyl ester; see German Patent No. 3017442, Mar. 8, 1983), or geranyl acetone (CAS #689-67-8);
Hindered Amine Light Stabilizers (HALS), represented by such commercial products as TINUVIN® 123 (CAS #129757-67-1) and TINUVIN® 152 (CAS #191743-75-6) from BASF, and Sanduvor® 3058 (CAS #79720-19-7) from Cytec. Such materials are well known in the art to scavenge free radicals and mitigate the damage caused by UV emissions within polymers. Additional examples of HALS may be found in, e.g., U.S. Pat. No. 5,719,218, hereby incorporated by reference; and
UV absorbers and energy quenchers, including benzotriazoles and nickel chelates, such as those listed in U.S. Pat. No. 4,870,121, hereby incorporated by reference. Specific examples include TINUVIN® 1130 (mixture of CAS #104810-47-1 and CAS #104810-48-2 and polyethylene glycol) and TINUVIN® 479 (CAS #204848-45-3) from BASF. UV absorbing material, such as octocrylene and menthylanthranilate, benzophenone (available under the trade name Uvinul®3008 from BASF), substituted benzophenones and TINUVIN®400 (CAS #153519-44).

When a rejuvenation fluid, containing additives such as those described above, is utilized, it is highly desirable that the various protective components diffuse rapidly into the cable insulation to prevent further degradation or failure. At the same time, it is expected that the components of the rejuvenation fluid will prolong the useful life of the cable for literally decades. Conventional additives, however, are discrete molecules or polymers whose natures do not change over time. Consequently, their diffusion rates also do not change over time. A conventional additive molecule which has a rapid diffusion rate that allows it to provide protection for the cable insulation shortly after injection of the rejuvenation fluid will not provide adequate long-term protection because it will diffuse through the cable wall and be lost to the exterior (exudation). In contrast, a conventional additive which has a slow diffusion rate that allows it to provide long term protection will take months or years to reach an effective level in the cable insulation, risking cable failure in the interim.

The lack of permanence is a significant problem for ferrocene and derivatives like butylferrocene which diffuse through polyethylene tubing quite rapidly as shown in FIG. 1. All of the material has left the tubing within 2000 h at 55° C., so a standard ferrocene derivative will not provide long term protection.

SUMMARY OF EXEMPLARY EMBODIMENTS OF THE INVENTION

Particular embodiments of the disclosure can be described in view of the following clauses:
1. An acyl metallocene compound of formula (1):

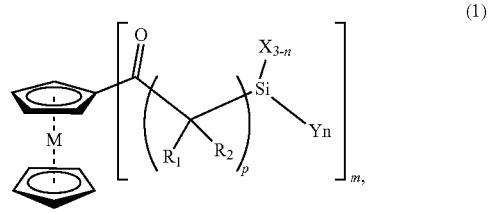

wherein
M is a metal ion selected from Fe(II), Mn(II), Ni(II), Co(II), Ru(II) or Os(II);
m is 1-4, where the silane acyl groups can be at any position(s) on one or both of the cyclopentadienyl rings;
p can vary from 2 to 20 carbon atoms;
$R_1$ and $R_2$ are $C_1$-$C_4$ linear or branched alkyl, or H;
X is a $C_1$-$C_5$ linear or branched alkyl;
Y is $C_1$-$C_4$ acyloxy, $C_1$-$C_4$ alkyloxy, or silyloxy; and
wherein for m=1, n is two or three, and for m=2-4, n is one, two, or three.

2. The compound of clause 1, wherein for formula (1): M is Fe(II).
3. The compound of clause 2, wherein for formula (1): M is Fe(II); m is 1-2; $R_1$ and $R_2$ are $C_1$-$C_2$ alkyl or H; X is $C_1$-$C_2$ alkyl; and Y is $C_1$-$C_4$ alkyloxy.
4. The compound of clause 3, wherein for formula (1): M is Fe(II); m is 1; $R_1$ and $R_2$ are H; X is —$CH_3$; and Y is $C_1$-$C_2$ alkyloxy.
5. The compound of clause 1, wherein the compound is selected from the group consisting of:

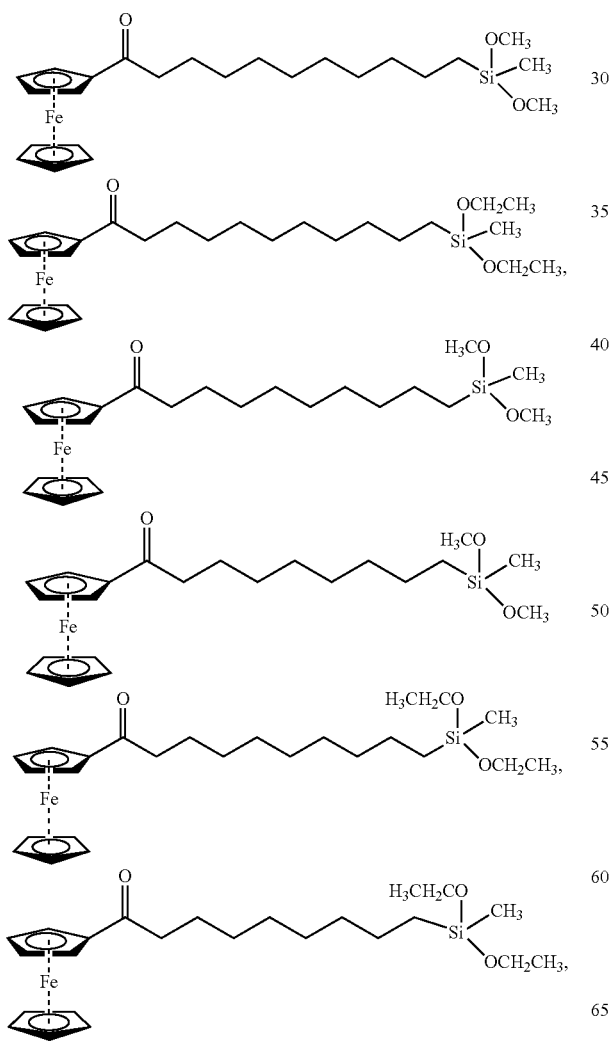

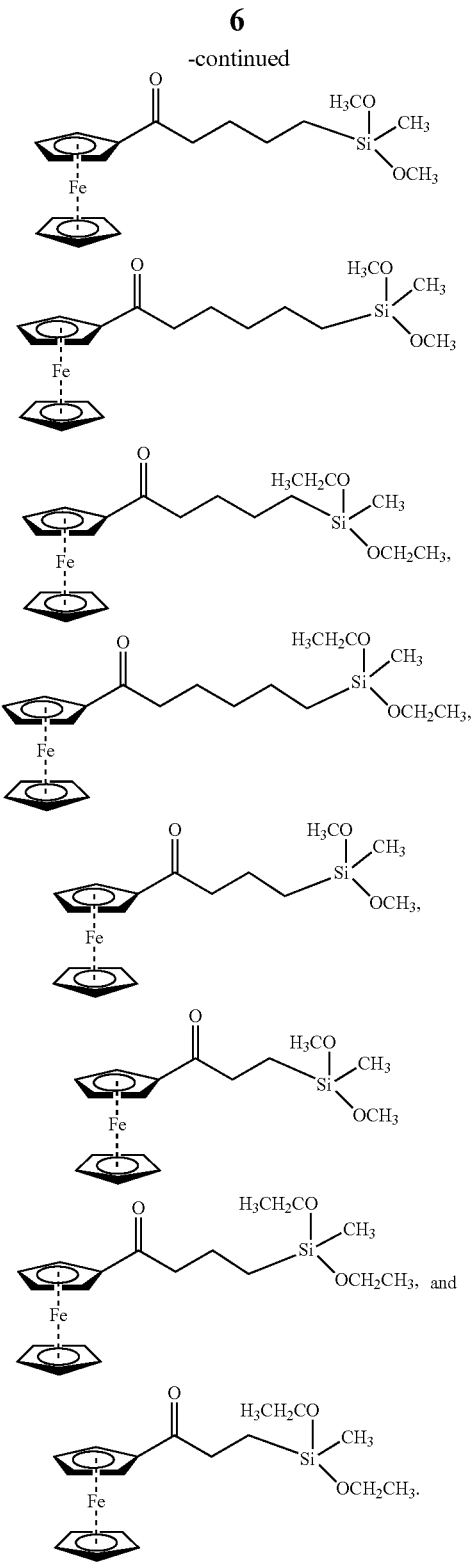

6. The compound of clause 5, wherein the compound is 11-(dimethoxymethylsilyl)-1-oxo-undecyl-1-ferrocene (AcylFc-DMS), or 3-(dimethoxymethylsilyl)-1-oxo-propyl-1-ferrocene.

7. A dielectric enhancement fluid, comprising:
(a) an acyl metallocene compound of formula (1):

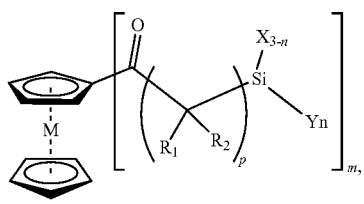

wherein:
M is a metal ion selected from Fe(II), Mn(II), Ni(II), Co(II), Ru(II) or Os(II);
m is 1-4, where the silane acyl groups can be at any position(s) on one or both of the cyclopentadienyl rings;
p can vary from 2 to 20 carbon atoms;
$R_1$ and $R_2$ are $C_1$-$C_4$ linear or branched alkyl, or H;
X is a $C_1$-$C_5$ linear or branched alkyl;
Y is $C_1$-$C_4$ acyloxy, $C_1$-$C_4$ alkyloxy, or silyloxy; and wherein for m=1, n is two or three, and for m=2-4, n is one, two, or three; and
(b) at least one component selected from:
(1) at least one a water-reactive material selected from:
(i) an organosilane monomer having at least two water-reactive groups,
(ii) the organosilane monomer (i) wherein at least one of the water-reactive groups is substituted with a condensable silanol group,
(iii) an oligomer of the above organosilane monomer (i), and/or
(iv) a co-oligomer of the above organosilane monomer (i) with a different organosilane monomer;
(2) a non-water-reactive organic material having a diffusion coefficient of less than about $10^{-9}$ cm$^2$/sec and an equilibrium concentration of at least about 0.005 gm/cm$^3$ in a polymeric insulation, the diffusion coefficient and the equilibrium concentration being determined at temperature T;
(3) metallocenes having a metal ion selected from Fe(II), Mn(II), Ni(II), Co(II), Ru(II) or Os(II), sandwiched between two cyclopentadienyl rings, and derivatives thereof;
(4) an organic compound having an equilibrium concentration in the polymeric insulation at 55° C., which is less than 2.25 times the equilibrium concentration at 22° C.;
(5) at least one silane functional additive derived from:
(i) a hindered phenolic antioxidant based on 2,6-di-tert-butyl phenol,
(ii) a hindered amine light stabilizer, based on tetramethyl piperidine, and/or
(iii) a UV absorber or energy quencher selected from benzotriazoles, triazines, benzophenones, and/or nickel chelates; and/or
(6) at least one catalyst suitable to catalyze hydrolysis and condensation of the water reactive materials of (a), (1), and (5).
8. The dielectric enhancement fluid of clause 7 wherein the catalyst is a strong acid, or a compound of titanium and/or tin.
9. The dielectric enhancement fluid of clause 7 or 8, wherein for formula (1): M is Fe(II).

10. The dielectric enhancement fluid of clause 9, wherein for formula (1): M is Fe(II); m is 1-2; $R_1$ and $R_2$ are $C_1$-$C_2$ alkyl or H; X is $C_1$-$C_2$ alkyl; and Y is $C_1$-$C_4$ alkyloxy.
11. The dielectric enhancement fluid of clause 10, wherein for formula (1): M is Fe(II); m is 1; $R_1$ and $R_2$ are H; X is —$CH_3$; and Y is $C_1$-$C_2$ alkyloxy.
12. The dielectric enhancement fluid of clause 11, wherein for formula (1) the compound is selected from the group consisting of:

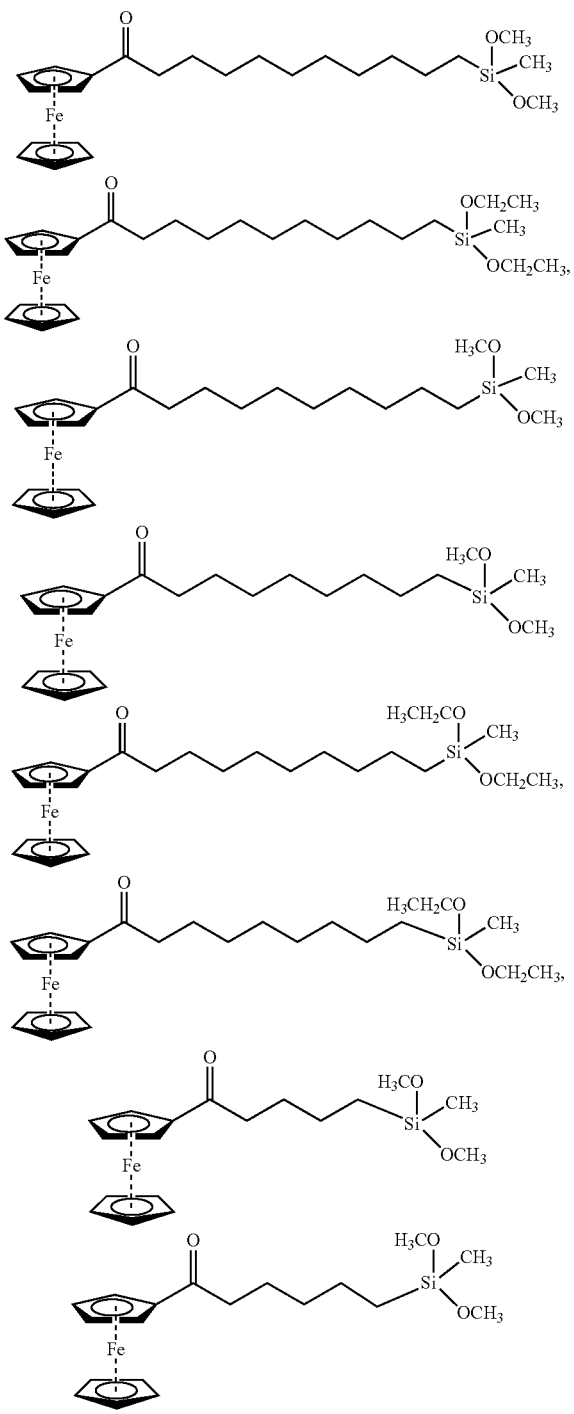

-continued

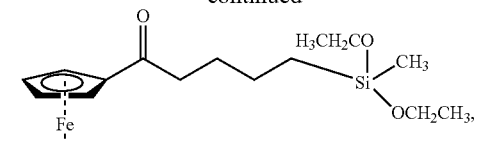

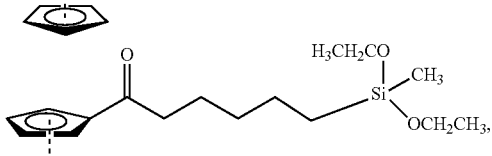

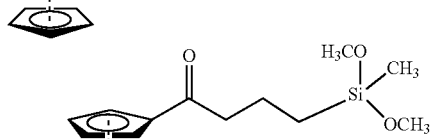

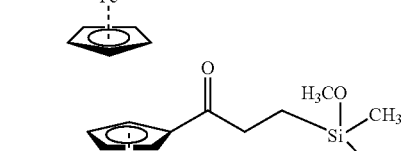

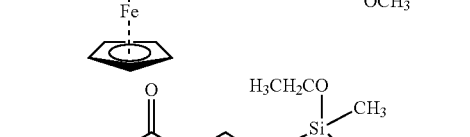

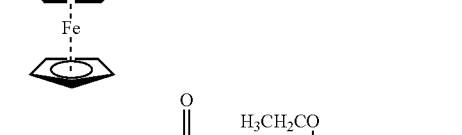

13. The dielectric enhancement fluid of clause 12, wherein the compound is 11-(dimethoxymethylsilyl)-1-oxo-undecyl-1-ferrocene (AcylFc-DMS), or 3-(dimethoxymethylsilyl)-1-oxo-propyl-1-ferrocene.

14. The dielectric enhancement fluid of any one of clauses 7-13, wherein for (5), the at least one silane functional additive is selected from:

(i) a hindered phenolic antioxidant of formula (XIX) or XIXa):

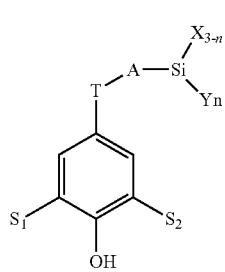

(XIX)

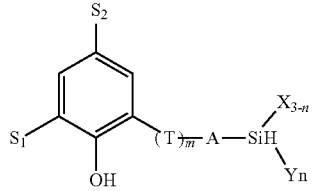

(XIXa)

wherein:
$S_1$ and $S_2$ can be equal or different $C_1$-$C_{10}$ branched alkyl;
m is zero or one;
T is oxygen or sulfur,
A is a $C_1$-$C_{10}$ linear or branched alkylene, or

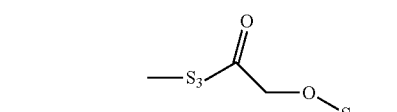

wherein $S_3$, $S_4$ and $S_5$ are $C_5$-$C_{10}$ linear or branched alkylene;
X is a $C_1$-$C_5$ linear or branched alkyl;
Y is hydrogen, halogen, $C_1$-$C_4$ acyloxy, $C_1$-$C_4$ alkyloxy, amino, amino-oxy or silyloxy; and
n is one, two or three;

(ii) a hindered amine light stabilizer of formula (XI):

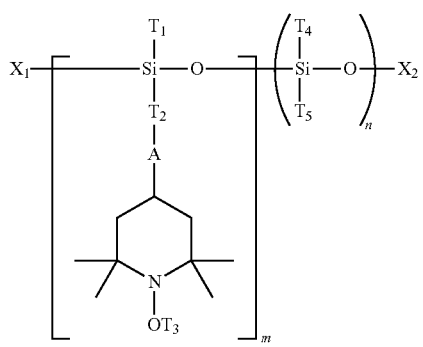

(XI)

wherein:
m+n is a number from 1 to 40, n varies from zero to 50% of the sum m+n;
A is —O—;
$T_1$ and $T_4$ which can be identical or different are methyl, methoxy, ethoxy or OH;
$T_2$ is trimethylene or is also a direct bond if A is —O— and $T_1$ and $T_4$ are methyl;
$T_3$ is methyl, $C_7$-$C_9$ alkyl or cyclohexyl;
$T_5$ is $C_1$-$C_{12}$ alkyl;
$X_1$ is as defined for Ti or is a group $(CH_3)_3$ SiO—; and
$X_2$ is hydrogen, methyl, ethyl, a group $(CH_3)_3$ Si— or, if n is zero and $T_1$ and $X_1$ are methyl, $X_2$ is also a group of the formula (XIII)

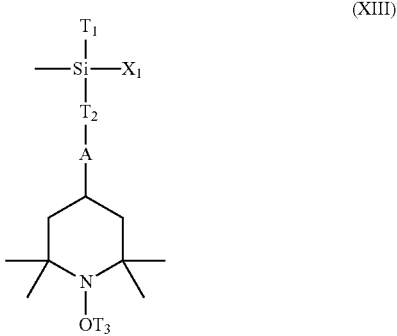

(XIII)

and, if m+n is a number from 3 to 10, $X_1$ and $X_2$ together can also be a direct bond; and/or (iii) a UV absorber or energy quencher of formula (IA) or (IIA)

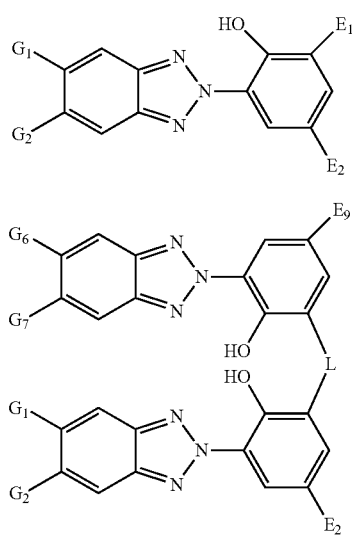

(IA)

(IIA)

wherein:

$G_1$ and $G_6$ are hydrogen;

$G_2$ and $G_7$ are independently H, cyano, $CF_3$—, fluoro, —CO-$G_3$, or $E_3SO_2$—;

$G_3$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;

$E_1$ is phenylalkyl of 7 to 15 carbon atoms, phenyl, or said phenyl or said phenylalkyl substituted on the phenyl ring by 1 to 4 alkyl groups of 1 to 4 carbon atoms each;

$E_2$ and $E_9$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE$_4$ or —N(E$_4$)$_2$, or mixtures thereof, where $E_4$ is straight or branched chain alkyl of 1 to 24 carbon atoms; or said alkyl or said alkenyl interrupted by one or more —O—, —NH—, or —NE$_4$- groups or mixtures thereof and which can be unsubstituted or substituted by one or more —OH, —OE$_4$, or —NH$_2$ groups or mixtures thereof;

$E_{11}$ is hydrogen, straight or branched chain alkyl of 1 to 18 carbon atoms, straight or branched chain alkenyl of 2 to 18 carbon atoms, cycloalkyl of 5 to 12 carbon atoms, aryl of 6 to 14 carbon atoms or phenylalkyl of 7 to 15 carbon atoms;

$E_3$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyls of 1 to 4 carbon atoms or 1,1,2,2-tetrahydroperfluoroalkyl where the perfluoroalkyl moiety is of 6 to 16 carbon atoms;

L is methylene; and with the proviso that at least one of $E_1$, $E_2$ and $E_9$ contains a group -T$_1$-Si(OR$_2$)$_n$(R$_1$)$_{3-n}$, -T$_1$-X—CO—X-T$_2$-Si(OR$_2$)$_n$(R$_1$)$_{3-n}$, -T$_1$-CO—X-T$_2$-Si(OR$_2$)$_n$(R$_1$)$_{3-n}$, —X-T$_1$-Si(OR$_2$)$_n$(R$_1$)$_{3-n}$ or —X-T$_1$-X—CO—X-T$_2$-Si(OR$_2$)$_n$(R$_1$)$_{3-n}$;

where, for $E_1$, $E_2$ and $E_9$, $T_1$ and $T_2$ are independently alkylene of 2 or 3 carbon atoms, $R_1$ and $R_2$ are independently alkyl of 1 to 6 carbon atoms or phenyl, n is 1, 2, or 3, and X is —O—, —NE$_4$- or —NH—.

15. A hydrosilylation gel, comprising:

(A) an acyl metallocene compound of formula (1):

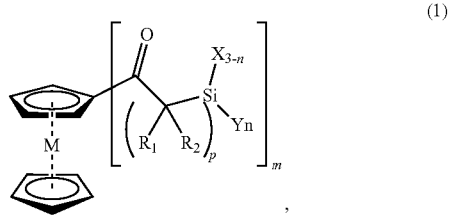

(1)

wherein:

M is a metal ion selected from Fe(II), Mn(II), Ni(II), Co(II), Ru(II) or Os(II);

m is 1-4, where the silane acyl groups can be at any position(s) on one or both of the cyclopentadienyl rings;

p can vary from 2 to 20 carbon atoms;

$R_1$ and $R_2$ are $C_1$-$C_4$ linear or branched alkyl, or H;

X is a $C_1$-$C_5$ linear or branched alkyl;

Y is $C_1$-$C_4$ acyloxy, $C_1$-$C_4$ alkyloxy, or silyloxy; and wherein for m=1, n is two or three, and for m=2-4, n is one, two, or three; and (B) at least one component selected from:

(a) an Si—H endblocked polydiorganosiloxane fluid with the formula H(R$_2$SiO)$_x$(R$_2$Si)H, wherein R is independently selected from alkyl radicals having from 1 to 6 carbon atoms or the phenyl radical and the average value of x is 1 to 40, and having a viscosity of 0.5 to about 100 centistokes at 25° C., (b) a polydiorganosiloxane fluid endblocked with groups containing unsaturated carbon-carbon functionality and having a viscosity of 0.5 to about 100 centistokes at 25° C., (c) a hydrosilylation catalyst suitable to cure the mixture of parts (a) and (b), and (d) at least one organoalkoxysilane functional additive selected from the group consisting of:
(i) a hindered phenolic antioxidant based on 2,6-di-tert-butyl phenol,
(ii) a hindered amine light stabilizer, based on tetramethyl piperidine, and/or
(iii) a UV absorber or energy quencher selected from benzotriazoles, triazines, benzophenones, and/or nickel chelates.

16. The hydrosilylation gel of clause 15, wherein for formula (1): M is Fe(II).

17. The hydrosilylation gel of clause 16, wherein for formula (1): M is Fe(II); m is 1-2; $R_1$ and $R_2$ are $C_1$-$C_2$ alkyl or H; X is $C_1$-$C_2$ alkyl; and Y is $C_1$-$C_4$ alkyloxy.

18. The hydrosilylation gel of clause 17, wherein for formula (1): M is Fe(II); m is 1; $R_1$ and $R_2$ are H; X is —$CH_3$; and Y is $C_1$-$C_2$ alkyloxy.

19. The hydrosilylation gel of clause 18, wherein for formula (1) the compound is selected from the group consisting of:

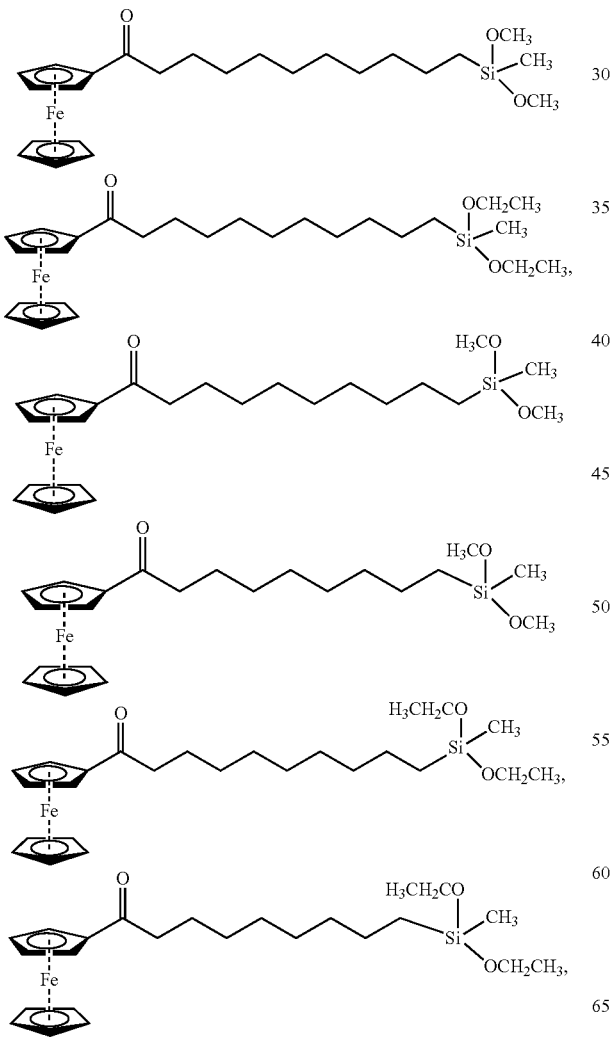

20. The hydrosilylation gel of clause 19, wherein the compound is 11-(dimethoxymethylsilyl)-1-oxo-undecyl-1-ferrocene (AcylFc-DMS), or 3-(dimethoxymethylsilyl)-1-oxo-propyl-1-ferrocene.

21. The hydrosilylation gel of any one of clauses 15-20, wherein for (d), the at least one organoalkoxysilane functional additive is selected from:
(i) a hindered phenolic antioxidant of formula (XIX) or XIXa):

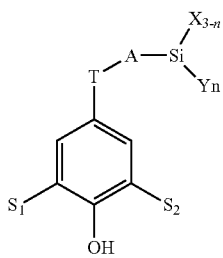

(XIX)

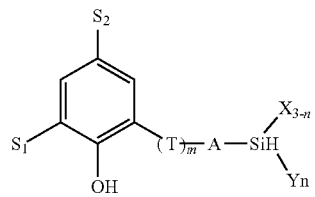

(XIXa)

wherein:
$S_1$ and $S_2$ can be equal or different $C_1$-$C_{10}$ branched alkyl;
m is zero or one;
T is oxygen or sulfur,
A is a $C_1$-$C_{10}$ linear or branched alkylene, or

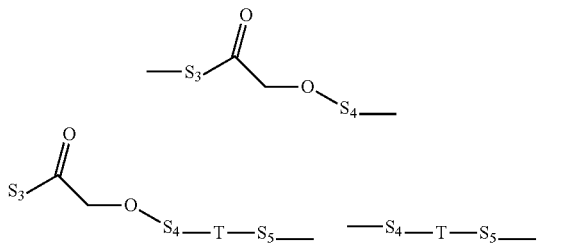

wherein $S_3$, $S_4$ and $S_5$ are $C_3$-$C_{10}$ linear or branched alkylene;
X is a $C_1$-$C_5$ linear or branched alkyl;
Y is hydrogen, halogen, $C_1$-$C_4$ acyloxy, $C_1$-$C_4$ alkyloxy, amino, amino-oxy or silyloxy; and
n is one, two or three;
(ii) a hindered amine light stabilizer of formula (XI):

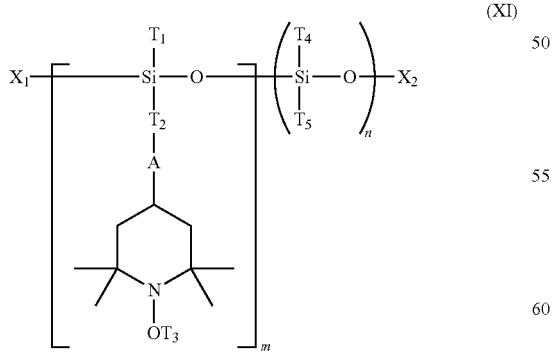

(XI)

wherein:
m+n is a number from 1 to 40, n varies from zero to 50% of the sum m+n;
A is —O—;
$T_1$ and $T_4$ which can be identical or different are methyl, methoxy, ethoxy or OH;
$T_2$ is trimethylene or is also a direct bond if A is —O— and $T_1$ and $T_4$ are methyl;
$T_3$ is methyl, $C_7$-$C_9$ alkyl or cyclohexyl;
$T_5$ is $C_1$-$C_{12}$ alkyl;
$X_1$ is as defined for Ti or is a group $(CH_3)_3$ SiO—; and
$X_2$ is hydrogen, methyl, ethyl, a group $(CH_3)_3$ Si— or, if n is zero and $T_1$ and $X_1$ are methyl, $X_2$ is also a group of the formula (XIII)

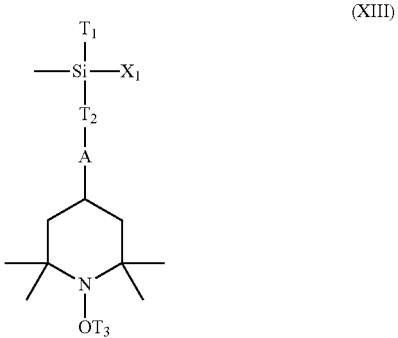

(XIII)

and, if m+n is a number from 3 to 10, $X_1$ and $X_2$ together can also be a direct bond; and/or
(iii) a UV absorber or energy quencher of formula (IA) or (IIA)

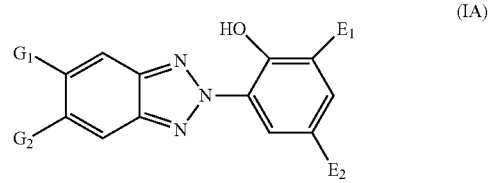

(IA)

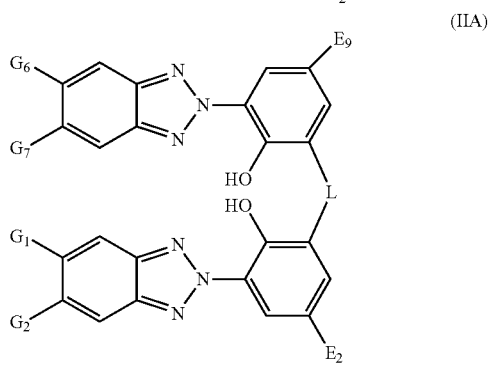

(IIA)

wherein:
$G_1$ and $G_6$ are hydrogen;
$G_2$ and $G_7$ are independently H, cyano, $CF_3$—, fluoro, —CO-$G_3$, or $E_3SO_2$—;
$G_3$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;
$E_1$ is phenylalkyl of 7 to 15 carbon atoms, phenyl, or said phenyl or said phenylalkyl substituted on the phenyl ring by 1 to 4 alkyl groups of 1 to 4 carbon atoms each;

$E_2$ and $E_9$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE$_4$ or —N(E$_4$)$_2$, or mixtures thereof, where $E_4$ is straight or branched chain alkyl of 1 to 24 carbon atoms; or said alkyl or said alkenyl interrupted by one or more —O—, —NH—, or —NE$_4$-groups or mixtures thereof and which can be unsubstituted or substituted by one or more —OH, —OE$_4$, or —NH$_2$ groups or mixtures thereof;

$E_{11}$ is hydrogen, straight or branched chain alkyl of 1 to 18 carbon atoms, straight or branched chain alkenyl of 2 to 18 carbon atoms, cycloalkyl of 5 to 12 carbon atoms, aryl of 6 to 14 carbon atoms or phenylalkyl of 7 to 15 carbon atoms;

$E_3$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyls of 1 to 4 carbon atoms or 1,1,2,2-tetrahydroperfluoroalkyl where the perfluoroalkyl moiety is of 6 to 16 carbon atoms;

L is methylene; and with the proviso that at least one of $E_1$, $E_2$ and $E_9$ contains a group -T$_1$-Si(OR$_2$)$_n$(R$_1$)$_{3-n}$, -T$_1$-X—CO—X-T$_2$-Si(OR$_2$)$_n$(R$_1$)$_{3-n}$, -T$_1$-CO—X-T$_2$-Si(OR$_2$)$_n$(R$_1$)$_{3-n}$, —X-T$_1$-Si(OR$_2$)$_n$(R$_1$)$_{3-n}$ or —X-T$_1$-X—CO—X-T$_2$-Si(OR$_2$)$_n$(R$_1$)$_{3-n}$;

where, for $E_1$, $E_2$ and $E_9$, $T_1$ and $T_2$ are independently alkylene of 2 or 3 carbon atoms, $R_1$ and $R_2$ are independently alkyl of 1 to 6 carbon atoms or phenyl, n is 1, 2, or 3, and X is —O—, —NE$_4$- or —NH—.

22. A method for extending the useful life of an insulated cable, comprising injecting, into a cable having a stranded conductor encased in a polymeric insulation jacket, a dielectric enhancement fluid comprising an acyl metallocene compound of formula (1) according to any one of claims 7-14, or a dielectric gel formulation comprising an acyl metallocene compound of formula (1) according to any one of claims 15-21, and wherein the acyl metallocene compound of formula (1) diffuses into the polymeric insulation.

23. A method for extending the useful life of in-service electrical cable, comprising injecting a dielectric enhancement fluid composition according to any one of claims 7-14, into at least one section of an electrical cable having a stranded conductor encased in a polymeric insulation jacket, and having an average operating temperature T, and wherein the injected composition provides for both initial permeation of the acyl metallocene compound of formula (1) into the polymeric insulation, and extended retention of subsequent condensation products of the acyl metallocene compound of formula (1) in the cable insulation.

24. A method for extending the useful life of an insulated cable, comprising injecting, into a cable having a stranded conductor encased in a polymeric insulation jacket, a dielectric gel formulation according to any one of claims 15-21, and wherein, after injection, the mixture of parts (a) and (b) is cured into a non-flowable gel in the cable, and wherein the acyl metallocene compound of formula (1) diffuses into the polymeric insulation.

DETAILED DESCRIPTION OF THE INVENTION

Figure 1:
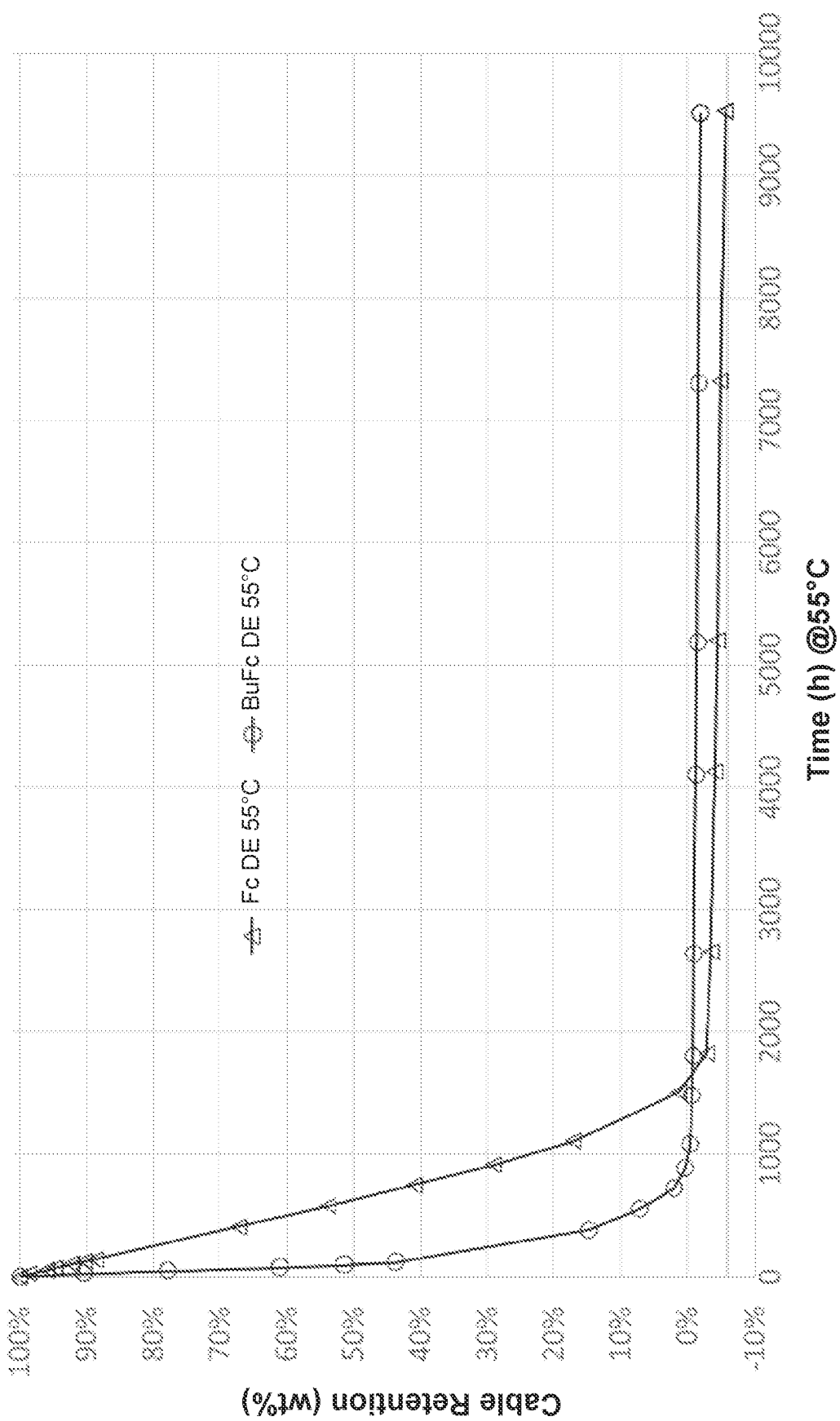
FIG. 1 shows, according to exemplary aspects of the present invention, exudation of Ferrocene and Butylferrocene through Polyethylene (PE).

Described herein are unique silyl functional acyl metallocene compounds having substantial utility as additives for use with underground cable insulation rejuvenation fluids and gels to enhance and extend long term performance of underground cable insulation. By covalently binding the active structure of the additives to oligomers formed upon hydrolysis of rejuvenation fluid or forming oligomers among themselves upon hydrolysis, these additives provide greater long-term stability by being immobilized in the matrix (e.g., interstitial void volume and polymeric insulation).

Tree-Retardant Fluid Embodiment

Aspects of the invention provide methods for extending the useful life of at least one in-service electrical cable section having a stranded conductor surrounded by a conductor shield encased in a polymeric insulation jacket with an outer insulation shield, and having an interstitial void volume in the region of the conductor, with the cable section having an average operating temperature T.

The methods comprise: injecting a dielectric enhancement fluid composition, which comprises one or more of the unique silyl functional acyl metallocene compounds disclosed herein, into the interstitial void volume, and/or into the space between the insulation jacket and outer polymeric insulation shield, said composition additionally comprising at least one component selected from:

(1) at least one water-reactive material selected from:
 (i) a class 1 organosilane monomer, as described herein, having at least two water-reactive groups,
 (ii) the above organosilane monomer (i) wherein at least one of the water-reactive groups has been substituted with a condensable silanol group,
 (iii) an oligomer of the above organosilane monomer (i); and/or
 (iv) a co-oligomer of the above organosilane monomer (i) with a different organosilane monomer;

(2) a non-water-reactive organic material having a diffusion coefficient of less than about $10^{-9}$ cm$^2$/sec and an equilibrium concentration of at least about 0.005 gm/cm³ in said polymeric insulation, the diffusion coefficient and the equilibrium concentration being determined at temperature T;

(3) metallocenes wherein a metallic atom such as Fe, Mn, Ni, Co, Ru or Os is "sandwiched" between two cyclopentadienyl rings and derivatives thereof;

(4) an organic compound having an equilibrium concentration in the polymeric insulation at 55° C., which is less than 2.25 times the equilibrium concentration at 22° C.;

(5) at least one silane functional additives derived from:
(i) antioxidants such as hindered phenolic additives based on 2,6-di-tert-butyl phenol derived products,
(ii) free radical scavengers that mitigate the damage caused by UV emissions within polymers such as Hindered Amine Light Stabilizers, based on tetramethyl piperidine derivatives, and/or
(iii) UV absorbers and energy quenchers, including benzotriazoles, triazines, benzophenones, nickel chelates;

(6) unique voltage stabilizers based on metallocenes, as disclosed herein, wherein a metallic atom such as Fe, Mn, Ni, Co, Ru or Os is "sandwiched" between two cyclopentadienyl rings, and one or more of the cyclopentadienyl rings is bound through at least one acyl group to a hydrocarbon chain which is bound to a water-reactive organosilane monomer; and/or (7) at least one catalyst suitable to catalyze hydrolysis and condensation of the water reactive materials of (1), (5), and (6), including but not limited to strong acids and certain compounds of titanium and tin.

The methods may be practiced, for example, by injecting the fluid into the interstitial void volume of a cable and confining it therein at an elevated pressure.

The first component class (Class 1) according to the present method is selected from: a water-reactive organosilane monomer having at least two water-reactive groups (i.e., the organosilane can undergo hydrolysis and subsequent condensation), such an organosilane monomer wherein at least one of the water-reactive groups has been substituted with a condensable silanol group (i.e., it has been partially or completely hydrolyzed), or an oligomer of the above described monomers, wherein each oligomer or co-oligomer has either residual water-reactive and/or silanol functionality. Thus, for example, the organosilane can be an alkoxy-functional organosilane, a reaction product thereof which contains residual alkoxy, or an enoloxy-functional organosilane, such as those illustrated below. Additional water-reactive systems contemplated include ketoximino, amino, amido, acyloxy and hydrido groups bonded to silicon. For the purposes herein, the monomer (or the monomer parent of any above-mentioned oligomer or co-oligomer) of the Class 1 component exhibits a diffusion coefficient in the insulation polymer which is at least about 15 times greater than that of the corresponding tetramer, the latter being terminated with either the residual water-reactive group(s) or silanol group(s). This ratio of diffusion coefficients of monomer to tetramer is measured at the average operating temperature of the cable, or preferably at the above defined flux-weighted temperature and is preferably greater than about 20.

Representative examples of Class 1 components include: Phenylmethyldimethoxysilane, (3-methylphenyl)methyldimethoxysilane, 3-cyanopropylmethyl dimethoxysilane, di(p-tolyl)dimethoxysilane, (4-methylphenyl)methyldimethoxysilane, 3-cyanobutylmethyldimethoxysilane, (4-methyphenethyl) methyldimethoxysilane, and Dimethyl di-n-butoxysilane.

When a Class 1 component is included in a dielectric enhancement fluid which also contains another condensable silane (i.e., not a Class 1 component but one which can condense with a Class 1 component), a co-oligomer can form between these species upon hydrolysis/condensation in addition to the respective homo-oligomers. Preferred Class 1 components include p-tolylethylmethyldimethoxysilane, cyanopropylmethyldimethoxysilanes (e.g., 3-cyanopropylmethyldimethoxysilane), and cyanobutylmethyldimethoxysilanes (e.g., 3-cyanobutylmethyldimethoxysilane). It is also preferred that the organoalkoxysilane components of any class described herein are used in conjunction with a condensation catalyst.

The second component class (Class 2) comprises non-water-reactive materials which have a diffusion coefficient of less than about $10^{-9}$ cm²/sec and have an equilibrium concentration of at least about 0.005 gm/cm³ in the insulation polymer of the cable at the average operating temperature of the cable T or, preferably, at above defined flux-weighted temperature $T_{flux-avg}$. Non-limiting examples of the Class 2 components include:

1. Hindered Amine Light Stabilizers (HALS), represented by such commercial products as TINUVIN® 123 (CAS #129757-67-1) and TINUVIN® 152 (CAS #191743-75-6) form BASF and Sanduvor® 3058 (CAS #79720-19-7) from Clariant. Such materials are well known in the art to scavenge free radicals and mitigate the damage caused by UV emissions within polymers. Additional examples of HALS may be found in, e.g., U.S. Pat. No. 5,719,218, hereby incorporated by reference;

2. Other light stabilizers, including triazoles and nickel chelates, such as those listed in U.S. Pat. No. 4,870,121, hereby incorporated by reference. Specific examples include TINUVIN® 1130 (mixture of CAS #104810-47-1 and CAS #104810-48-2 and polyethylene glycol) and TINUVIN® 479 (CAS #204848-45-3) from BASF; and/or 3. UV absorbing material, such as octocrylene and menthylanthranilate, benzophenone (available under the trade name Uvinul®3008 from BASF), substituted benzophenones and TINUVIN® 400 (CAS #153519-44-9).

Those skilled in the art will readily recognize that many of the Class 2 components are solids at typical injection temperatures and, therefore, can be injected only as part of a dielectric enhancement formulation wherein the solid (e.g., TINUVIN® 152) is either dissolved or suspended in a fluid. Of course, this restriction applies to any solid component according to the present methods (e.g., ferrocene). An advantage of employing such a solid component is that it imparts an increased density to the injection formulation, which allows even more functional material to be supplied to the cable insulation.

Class 3 materials include metallocenes wherein a metallic atom such as Fe, Mn, Ni, Co, Ru or Os is "sandwiched" between two cyclopentadienyl rings. Specific examples include ferrocene, ruthenocene, osmocene and derivatives thereof, such as n-butylferrocene and octanoyl ferrocene. Such components act as voltage stabilizers and UV absorbers.

The fourth component class (Class 4) comprises materials which have a ratio of equilibrium concentration (solubility) at 55° C. to equilibrium concentration at 22° C. in the cable insulation polymer of less than 2.25, and more preferably less than 2.0. Particular prior art materials suffer from values more than 2.25, which increases the risk of supersaturation when a cable goes through significant temperature fluctuations, as described by U.S. Pat. No. 6,162,491. Class 4 materials exhibit a surprisingly low change in equilibrium concentration in the insulation polymer as a function of temperature, thereby decreasing their contribution to the above cited supersaturation phenomenon. It is noted that ferrocene, for example, is representative of both class 3 and class 4 components, and that cyanopropyl methyldimethoxysilanes and cyanobutyl methyldimethoxysilanes, for example, are representative of both class 1 and class 4 components. Non-limiting examples of Class 4 materials are ferrocene (both a class 3 and class 4 component), 3-cyanobutylmethyldimethoxysilane, 3-cyanopropylmethyldimethoxysilane and 2-cyano-butylmethyldimethoxysilane.

An additional advantage associated with the use of the above four described component classes is that the components according to the instant methods generally exhibit relatively low vapor pressures and high flash points which decrease the fire and explosion hazard associated with injection of volatile materials.

The fifth component class (Class 5) comprises silane functional variants of class 3 components, including:
  (i) Antioxidants such as hindered phenolic additives based on 2,6-di-tert-butyl phenol derived products;
  (ii) Free radical scavengers that mitigate the damage caused by UV emissions within polymers such as Hindered Amine Light Stabilizers, based on tetramethyl piperidine derivatives; and/or
  (iii) UV absorbers and energy quenchers, including benzotriazoles, triazines, benzophenones, nickel chelates.

Class 6 components consist of unique voltage stabilizers based on metallocenes, as disclosed herein, wherein a metallic atom such as Fe, Mn, Ni, Co, Ru or Os is "sandwiched" between two cyclopentadienyl rings, and one or more of the cyclopentadienyl rings is bound through an acyl group to a hydrocarbon chain which is bound to a water-reactive organosilane monomer. Representative compounds of Class 6 would include, but are not limited to 6-dimethoxymethylsilyl-hexanoylferrocene and 11-dimethoxymethylsilyl-undecanoylferrocene.

The seventh component class comprises one or more hydrolysis/condensation catalysts. The catalysts contemplated herein are any of those known to promote the hydrolysis and condensation of organoalkoxysilanes. Typically, these are selected from organometallic compounds of tin, manganese, iron, cobalt, nickel, lead, titanium or zirconium. Examples of such catalysts include, but are not limited to, alkyl titanates, acyl titanates and the corresponding zirconates. Specific non-limiting examples of suitable catalysts include tetra-t-butyl titanate (TBT), dibutyltin diacetate (DBTDA), dibutyltin dilaurate (DBTDL), dibutyltindioleate, tetraethyl orthotitanate, tetraisopropyl titanate (TIPT), tetra octadecyl orthotitanate, dibutyltin dioctoate, stannous octoate, dimethyltinneodeconoate, di-N-octyltin-S, S-isooctylmercaptoacetate, dibutyltin-S, S-dimethyl mercaptoacetate, or diethyltin-S, S-dibutylmercaptoacetate. In general, the catalyst is added at a level of about 0.05 to about 5% based on the total weight of the organoalkoxysilane components. More typically, it is supplied at a level of about 0.1 to about 2% or at a level of about 0.2 to 1% by weight according to the above-mentioned basis.

Also preferred are hydrolysis/condensation catalysts based on an acid having a pKa less than about 2.1 which have been well documented in U.S. Pat. No. 7,700,871. The acid catalyst to be included in the dielectric property-enhancing fluid composition of the instant methods has, for example, a pKa less than about 2.1 and is added in an effective amount for promoting the hydrolysis reaction of the organoalkoxysilane with water and subsequent condensation of the resulting product of hydrolysis. For the purposes herein, pKa has its usual definition of the negative logarithm (base 10) of the equilibrium constant (Ka) for the dissociation of the acid. Preferably, the acid to be used in the instant method has a pKa value between about −14 and about 0. The optimum acid catalyst content may be determined experimentally using, e.g., model cable tests (e.g., as described in U.S. Pat. No. 11,749,422, incorporated by reference herein). One skilled in the art will appreciate that it is desirable to employ an amount of acid catalyst which results in the retention of essentially all hydrolysis/condensation products in the model cable. However, this amount should be balanced by the cost of the catalyst. Moreover, the acid content should be kept as low as possible since it can contribute to the corrosion of the cable conductor, and this factor should be considered in the balance. Although it is recognized that the catalyst and the organoalkoxysilane interact on a molar basis, the acid catalyst (b) should generally be added at a level of about 0.02 to about 1% based on the weight of the organoalkoxysilane (a) component. More typically, it should be supplied at a level of from about 0.05 wt. % to about 0.6 wt. %, preferably from about 0.06 wt. % to about 0.5 wt. %. Preferably, the acid catalyst (b) is selected from strong acids which essentially dissociate completely in an aqueous solution. For the purposes herein, preferred acids include dodecylbenzene sulfonic acid (DDBSA), methane sulfonic acid, trifluoromethanesulfonic acid, benzenesulfonic acid, alkyl substituted benzenesulfonic acids and alkyl substituted naphthalene sulfonic acids, sulfuric acid, nitric acid, trifluoracetic acid, dichloroacetic acid and phosphoric acid.

Furthermore, these components ((1)-(7)) may be included in a dielectric property-enhancing fluid composition to be used either in a conventional (low-pressure) restoration method or the previously mentioned high-pressure treatment method of U.S. Pat. No. 8,572,842 which employs special high-pressure connectors of the type described in U.S. Pat. No. 7,683,260. In brief, the high-pressure method comprises filling the interstitial void volume of the cable with at least one dielectric property-enhancing fluid composition at a pressure below the elastic limit of the polymeric insulation jacket, and confining the dielectric property-enhancing fluid within the interstitial void volume at a residual pressure greater than about 50 psig, the pressure being imposed along the entire length of the cable and being below the elastic limit, wherein, for example, the composition includes, along with one or more unique silane functional acyl metallocene compound additives as disclosed herein, at least one component selected from Class 1, Class 2, Class 3 or Class 4.

As used herein, the term "elastic limit" of the insulation jacket of a cable section is defined as the internal pressure in the interstitial void volume at which the outside diameter (OD) of the insulation jacket takes on a permanent set at 25° C. greater than 2% (i.e., the OD increases by a factor of 1.02 times its original value), excluding any expansion (swell) due to fluid dissolved in the cable components. This limit can, for example, be experimentally determined by pressurizing a sample of the cable section with a fluid having a solubility of less than 0.1% by weight in the conductor shield and in the insulation jacket (e.g., water), for a period of about 24 hours, after first removing any covering such as insulation shield and wire wrap. After the pressure is released, the final OD is compared with the initial OD in making the above determination. The actual pressure used to fill the interstitial void volume is not critical provided the above-defined elastic limit is not attained. After the desired amount of the fluid has been introduced, the fluid is confined within the interstitial void volume at a sustained residual pressure greater than about 50 psig. It is preferred that the residual pressure is between about 100 psig and about 1000 psig, most preferably between about 300 psig and 600 psig. Further, it is preferred that the injection pressure is at least as high as the residual pressure to provide an efficient fill of the cable section (e.g., 550 psig injection and 500 psig residual). In another embodiment of this method, the residual pressure is sufficient to expand the interstitial void volume along the entire length of the cable section by at least 5%, again staying below the elastic limit of the polymeric insulation jacket. It is also contemplated that the dielectric property-enhancing fluid composition may be supplied at a pressure greater than about 50 psig for more than about 2 hours before being contained in the interstitial void volume. It is further preferred that the dielectric property-enhancing fluid composition is selected such that the residual pressure decays to essentially zero psig due to diffusion into the conductor shield and into the insulation jacket of the cable. This pressure decay generally occurs over a period of greater than about 2 hours, preferably in more than about 24 hours, and in most instances within about two years of containing the fluid composition. It is to be understood that this pressure decay results from diffusion of the various components of the composition out of the interstitial volume and not by leaking past any connector.

The method for treating cables under sustained pressure to enhance the cable segment involves filling the interstitial void volume with at least one dielectric property-enhancing fluid as described herein at a pressure below the elastic limit of the polymeric insulation jacket, and subsequently confining the dielectric property-enhancing fluid within the interstitial void volume at a desirable sustained residual pressure imposed along the entire length of the cable segment and, again, below the elastic limit. The method for treating cables under sustained pressure exploits the discovery that, when the interstitial void volume of a cable segment is filled with a dielectric property-enhancing fluid and the fluid confined therein at a high residual pressure, the volume of fluid actually introduced significantly exceeds the volume predicted from a rigorous calculation of the cable's expansion at the imposed pressure. The difference between the observed and calculated volume change increases with pressure and is believed to be due mainly to the accelerated adsorption of the fluid in the conductor shield as well as transport thereof through the conductor shield and insulation of the cable. Thus, with sufficient residual sustained pressure, it is possible to expand the insulation jacket of an in-service cable segment in a manner that is so slight as to not cause any mechanical damage to the cable or to induce any untoward electrical effects, yet large enough to significantly increase the volume of dielectric property-enhancing fluid which can be introduced. As a result, and unlike the prior art, the integrated method does not require the soak period, and the associated external pressure reservoir, to introduce a sufficient amount of fluid to effectively treat the cable segment. As noted elsewhere herein, the term "elastic limit" of the insulation jacket of a cable segment is defined as the internal pressure in the interstitial void volume at which the outside diameter of the insulation jacket takes on a permanent set greater than 2% at 25° C. (i.e., the OD increases by a factor of 1.02 times its original value), excluding any expansion (swell) due to fluid dissolved in the cable components. For the purposes herein, it is preferred that the above-mentioned residual pressure is no more than about 80% of the above defined elastic limit.

The in-service cable segment to which the disclosed methods are generally applied is the type used in underground residential distribution and typically comprises a central core of a stranded copper or aluminum conductor encased in a polymeric insulation jacket. The strand geometry of the conductor defines an interstitial void volume. As is well known in the art, there is usually also a semi-conducting polymeric conductor shield positioned between the conductor and insulation jacket. However, this shield can also be of a high permittivity material sometimes utilized in EPR cables. Further, low voltage (secondary) cables do not employ such a shield. In addition, the cables contemplated herein often further comprise a semi-conducting insulation shield covering the insulation jacket, the latter being ordinarily wrapped with a wire or metal foil grounding strip and, optionally, encased in an outer polymeric, metallic, or combination of metallic and polymeric, protective jacket. The insulation material is preferably a polyolefin polymer, such as high molecular weight polyethylene (HMWPE), cross-linked polyethylene (XLPE), a filled copolymer or rubber of ethylene and propylene (EPR), vinyl acetate or is a solid-liquid dielectric such as paper-oil. The base insulation may have compounded additives such as antioxidants, tree-retardants, plasticizers, and fillers to modify properties of the insulation. Medium voltage, low voltage and high voltage cables are contemplated herein.

The term "in-service" refers to a cable segment which has been under electrical load and exposed to the elements for an extended period. In such a cable, the electrical integrity of the cable insulation has generally deteriorated to some extent due to the formation of water trees, as described above. It is also contemplated, however, that the method discussed can be used to enhance the dielectric properties of a new cable as well as an in-service cable.

"Sustained pressure," as referred to herein, indicates that the fluid is contained or trapped within a cable segment's interstitial void volume at the residual pressure after the pressurized fluid source is removed, whereupon the pressure decays only by subsequent permeation through the conductor shield and insulation, as described herein. The method for treating cables under sustained pressure exploits the relationship between pressure and the augmented injection volume under sustained residual pressure, and demonstrates the feasibility of eliminating or reducing the soak phase on cables with small conductors.

Dielectric Gel Embodiment

Additional embodiments of the methods comprise: injecting a dielectric enhancement gel composition, which comprises one or more of the unique silyl functional acyl metallocene compounds as disclosed herein, into the interstitial void volume, and/or into the space between the insulation and outer jacket, said composition additionally comprising:

A. an Si—H endblocked polydiorganosiloxane fluid having a viscosity of 0.5 to about 100 centistokes at 25° C. and represented by the formula $H(R_2SiO)_x(R_2Si)H$ wherein R is independently selected from alkyl radicals having from 1 to 6 carbon atoms or the phenyl radical and the average value of x is 1 to 40;

B. a polydiorganosiloxane fluid having a viscosity of 0.5 to about 100 centistokes at 25° C. and represented by the formula

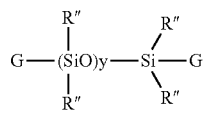

wherein G denotes unsaturated radicals independently selected from the vinyl group or higher alkenyl radicals represented by the formula —R'''(CH$_2$)$_m$CH═CH$_2$, in which R''' denotes —(CH$_2$)$_p$— or —(CH$_2$)$_q$CH═CH—, m is 1, 2 or 3, p is 3 or 6, and q is 3, 4 or 5, R" is independently selected from an alkyl radical having 1 to 6 carbon atoms or a phenyl radical, and y is on the average from 1 to about 40;

C. sufficient hydrosilylation catalyst to cure the mixture of (A) and (B);

D. at least one silane functional variants, selected from:
   i. Antioxidants such as hindered phenolic additives based on 2,6-di-tert-butyl phenol derived products,
   ii. Free radical scavengers that mitigate the damage caused by UV emissions within polymers such as Hindered Amine Light Stabilizers, based on tetramethyl piperidine derivatives, and
   iii. UV absorbers and energy quenchers, including benzotriazoles, triazines, benzophenones, nickel chelates; and E. preferably, at least one material which functions as a catalyst for the hydrolysis and condensation of the silane functional variants (D) and does not significantly affect the cure of the mixture of (A) and (B) by the catalyst (C).

The hydrosilylation catalyst (component C) for the reaction between the polydiorganosiloxane fluid endblocked with unsaturated organic radicals and the Si—H endblocked polydiorganosiloxane fluid can include a variety of hydrosilylation catalysts known to promote the reaction of vinyl-functional radicals with silicon bonded hydrogen atoms. Active metal catalysts such as platinum or rhodium-containing metal compounds are included in this class of catalysts. Platinum catalysts such as platinum acetylacetonate or chloroplatinic acid are representative of these compounds and suitable for use as component C. A preferred catalyst mixture is a chloroplatinic acid complex of divinyl-tetramethyldisiloxane diluted in toluene, commonly known as Karstedt's catalyst.

To the formulation above including parts A, B, C, D, and E, an optional siloxane crosslinker selected from short chain linear or cyclic siloxanes containing SiH functionality or Si-G functionality, in which G has the above-defined meaning can be added.

Further, sufficient hydrosilylation inhibitor could be added to the formulation above to extend the time to viscosity doubling or the time to cure into a non-flowing state. The use of α-acetylenic compounds, especially acetylenic-α,α'-diols as inhibitors for hydrosilylation is described in U.S. Patent Application Publication No. 2014/0004359A1 and references therein. The use of maleate and fumarate compounds is well known to those skilled in the art and is described in "The Chemistry of Fumarate and Maleate Inhibitors with Platinum Hydrosilylation Catalysts," J. Orgmetal. Chem., (1996) 521, 221-227. Examples of suitable fumarate and maleate inhibitors could include dimethylfumarate, diethylfumarate, dibutylfumarate, diphenylfumarate, fumaric acid, dimethylmaleate, diethylmaleate dibutylmaleate, diphenylmaleate, and maleic acid or other such inhibitors.

One or more hydrolysis/condensation catalysts (E) are included in the formulation of A, B, C, and D above. The catalysts contemplated herein are any of those known to promote the hydrolysis and condensation of organoalkoxysilanes provided that the hydrolysis/condensation catalysts do not interfere with the cure of the gel formulation containing (A), (B), (C), optional siloxane crosslinker, and optional hydrosilylation inhibitor.

Preferred hydrolysis/condensation catalysts of component (E) are organometallic compounds of tin, manganese, iron, cobalt, nickel, lead, titanium, or zirconium. Examples of such catalysts include alkyl titanates, acyl titanates and the corresponding zirconates. Specific non-limiting examples of suitable catalysts include tetra-t-butyl titanate (TBT), dibutyltindiacetate (DBTDA), dibutyltindilaurate (DBTDL), dibutyltindioleate, tetraethylorthotitanate, tetraisopropyl titanate (TIPT), tetraoctadecylorthotitanate, dibutyltindioctoate, stannous octoate, dimethyltinneodeconoate, di-N-octyltin-S, S-isooctylmercaptoacetate, dibutyltin-S, S-dimethylmercaptoacetate, or diethyltin-S,S-dibutylmercaptoacetate. In general, the catalyst is added at a level of about 0.05 to about 5% based on the total weight of the organoalkoxysilane components. More typically, it is supplied at a level of about 0.1 to about 2% or at a level of about 0.2 to 1% by weight according to the above-mentioned basis.

Silyl Functional Acyl Metallocene Derivatives:

A metallocene moiety in which a metal is sandwiched between two cyclopentadienyl rings is illustrated immediately below. Although the metallocene is shown with implicit hydrogen atoms on the cyclopentadienyl rings, for purposes of the present invention, it is understood that substituents such as alkyl or acyl groups could also be present on the cyclopentadienyl rings.

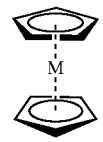

The unique silane functional acyl metallocene compounds as disclosed herein are compounds in which the cyclopentadienyl ligands are derivatized with one or more acyl groups each of which contains a silane moiety, which has one or more groups which are hydrolyzable to silanol. More particularly, the reactive acyl metallocene class of compounds of the present invention pertain to compounds of the following formula (1):

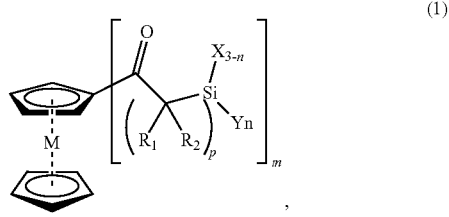

wherein:
M is a metallic atom in the +2 oxidation state selected from Fe(II), Mn(II), Ni(II), Co(II), Ru(II) or Os(II), preferably Fe(II);
m is 1-4, with up to four functional silane groups attached to every metallocene moiety, where the silane groups may all be at any position(s) on one of the cyclopentadienyl rings or distributed between them at any position(s);
the carbonyl group and the silicon are joined by a linear alkyl radical where p can vary from 2 to 20 carbon atoms;
$R_1$ and $R_2$ are linear or branched alkyl radicals or hydrogen (preferably $C_1$-$C_4$ linear or branched alkyl radicals or hydrogen);
X is a linear or branched alkyl radical containing from 1 to 5 carbon atoms (preferably $C_1$-$C_4$ linear or branched alkyl radical), and more preferably the methyl radical;
Y is $C_1$-$C_4$ acyloxy, $C_1$-$C_4$ alkyloxy, or silyloxy, and preferably $C_1$-$C_2$ alkyloxy; and
wherein
for m=1, n is two or three, and for m=2-4, n is one, two, or three.

Preferred exemplary species of the reactive ferrocene compounds include the following compounds:

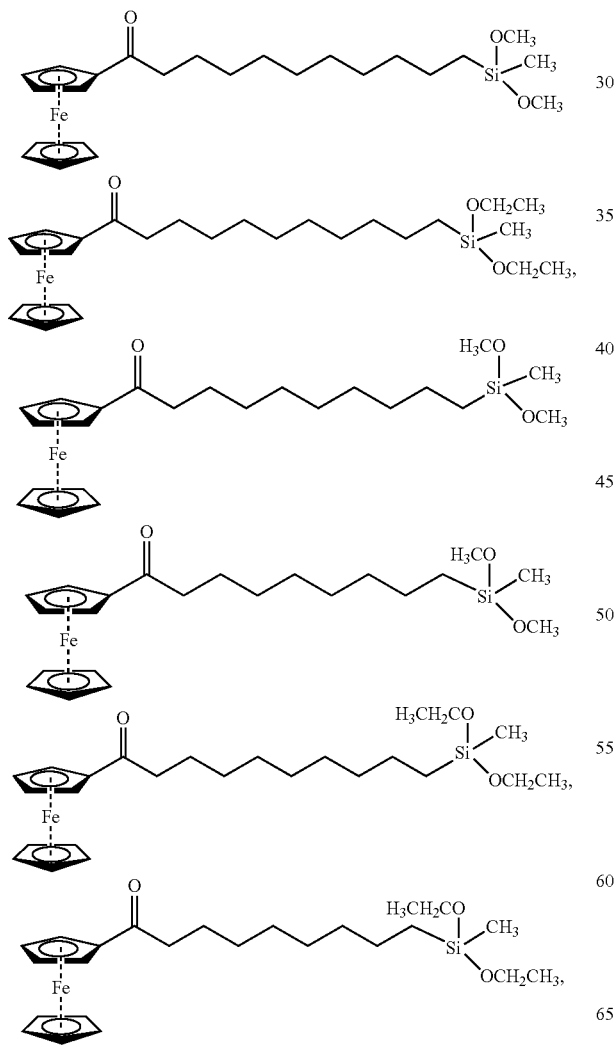

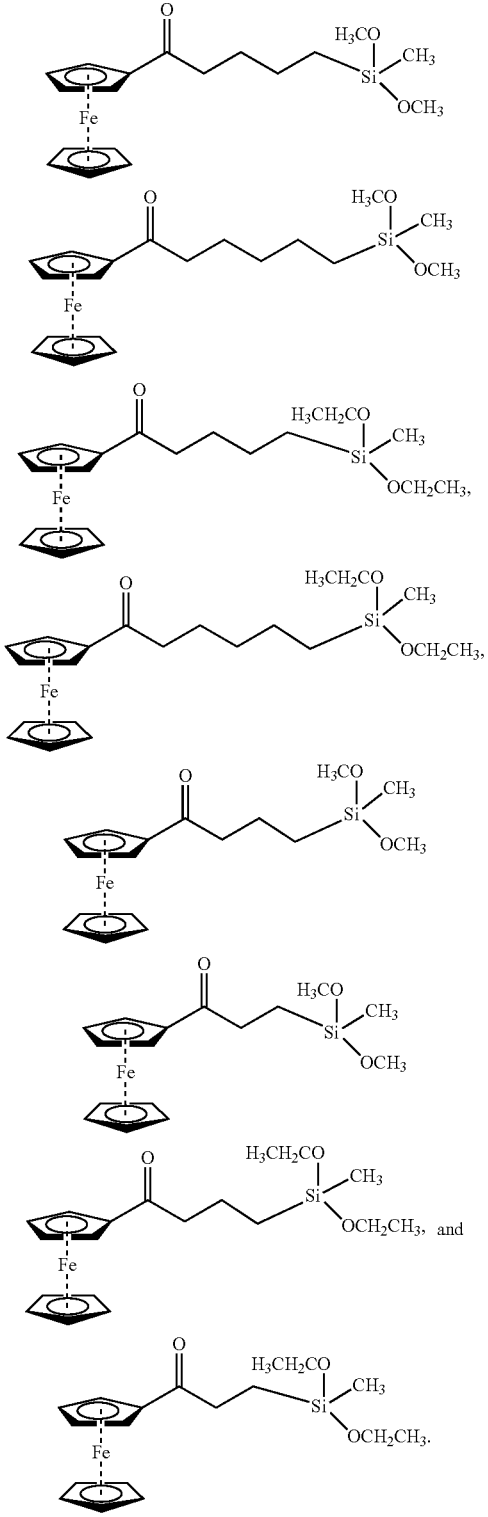

The silane functional acyl metallocene compounds of the current invention can be prepared by the hydrosilylation of the corresponding unsaturated acyl ferrocene precursor of formula (2):

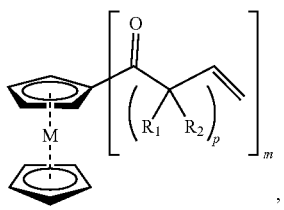

(2)

which is readily available from the Friedel-Crafts acylation of ferrocene with the appropriate acyl chloride, acid, or acid anhydride.

One class of silylation agents suitable for this purpose is definable by the formula with X and Y as defined above:

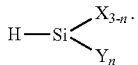

Specific examples of silylation agents falling within general formula include:

HSi(CH$_3$)$_2$Cl; HSi(CH$_3$)Cl$_2$; HSiCl$_3$; HSi(OCH$_3$)$_2$(CH$_3$);

HSi(CH$_3$)(OC$_2$H$_5$)$_2$; HSi(OC$_2$H$_5$)$_3$; HSi(OCH$_3$)$_3$;

HSi(CH$_3$)$_2$—O—Si(CH$_3$)(OCH$_3$)$_2$; HSi(CH$_3$)$_2$ONC(CH$_3$)$_2$; and

HSi(CH$_3$)$_2$[ONC(CH$_3$)$_2$]$_2$.

Silyl Functional Benzotriazole UV Absorbers:

The dielectric enhancement fluid and hydrosilylation gel compositions, and methods of using same of the invention may comprise and use benzotriazole compounds of formula (I) or (II) below:

Formulae (I) and (II)

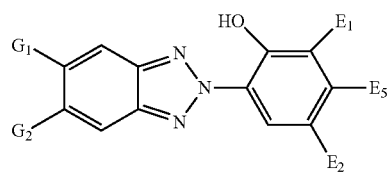
(I)

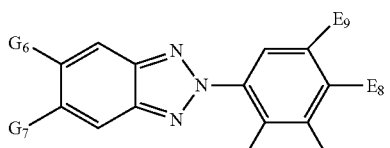
(II)

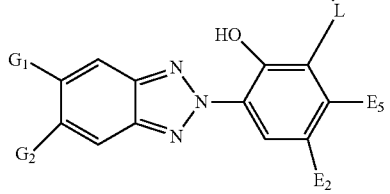

Where:

$G_1$ and $G_6$ are independently hydrogen or halogen.

$G_2$ and $G_7$ are independently H, cyano, perfluoroalkyl of 1 to 12 carbon atoms, fluoro, chloro, —CO-$G_3$, —COO$G_3$, —CONH$G_3$, —CON($G_3$)$_2$, $E_3$SO—, $E_3$SO$_2$—, —PO(C$_6$H$_5$)$_2$,

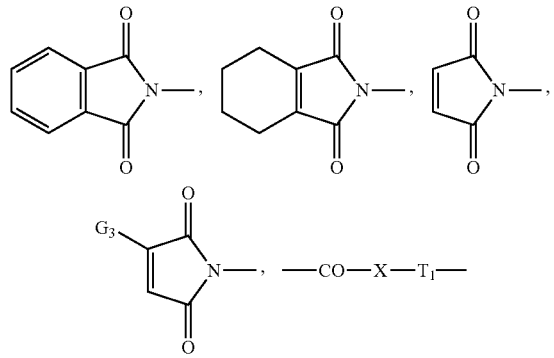

O—CO—NH-T$_2$-Si(OR$_2$)$_n$(R$_1$)$_{3-n}$ or —CO—X-T$_1$-Si(OR$_2$)$_n$(R$_1$)$_{3-n}$;

or $G_7$ is also hydrogen.

or $G_2$ may also be hydrogen when $E_1$ is a group of formula (IV) or (V) (see below);

$T_1$ and $T_2$ are independently alkylene of 1 to 18 carbon atoms, preferably alkylene of 2 or 3 carbon atoms, or alkylene-phenylene-alkylene of 8 to 20 carbon atoms;

$R_1$ and $R_2$ are independently alkyl of 1 to 18 carbon atoms, cycloalkyl of 5 to 12 carbon atoms, aryl of 6 to 10 carbon atoms or phenylalkyl of 7 to 20 carbon atoms, preferably alkyl of 1 to 6 carbon atoms or phenyl.

n is 1, 2 or 3.

X is —O—, —NE$_4$— or —NH—.

$G_3$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;

$E_1$ is hydrogen, straight or branched chain alkyl of 1 to 24 carbon atoms, straight or branched chain alkenyl of 2 to 24 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms or by one or more of the following groups -T$_1$-Si(OR$_2$)$_n$(R$_1$)$_{3-n}$, -T$_1$-X—CO—X-T$_2$-Si(OR$_2$)$_n$(R$_1$)$_{3-n}$, -T$_1$-CO—X-T$_2$-Si(OR$_2$)$_n$(R$_1$)$_{3-n}$, —X-T$_1$-Si(OR$_2$)$_n$(R$_1$)$_{3-n}$, or —X-T$_1$-X—CO—X-T$_2$-Si(OR$_2$)$_n$(R$_1$)$_{3-n}$;

or $E_1$ is alkyl of 1 to 24 carbon atoms substituted by one or two hydroxy groups.

or $E_1$ is a group of formula (IV) or (V) (see below).

Formulae (IV) and (V)

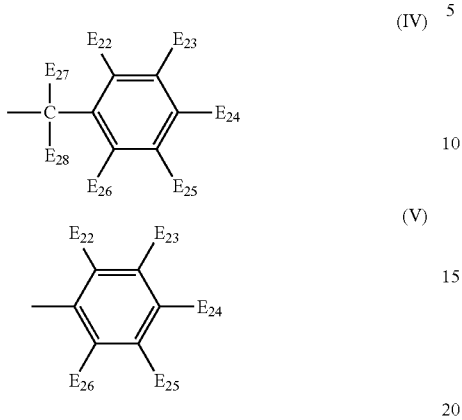

Where:
$E_{27}$ and $E_{28}$ are independently alkyl of 1 to 18 carbon atoms, or cycloalkyl of 5 to 12 carbon atoms.

$E_{22}$, $E_{23}$, $E_{24}$, $E_{25}$ and $E_{26}$ are independently hydrogen, halogen, straight or branched alkyl of 1 to 18 carbon atoms, alkenyl of 2 to 18 carbon atoms, said alkyl or said alkenyl substituted by one or more halogen, —$OCOE_{11}$, —$OE_4$, —NCO, —$NHCOE_{11}$, or —$NE_7E_8$, or mixtures thereof, where $E_4$ is straight or branched chain alkyl of 1 to 24 carbon atoms or straight or branched chain alkenyl of 2 to 18 carbon atoms; or said alkyl or said alkenyl interrupted by one or more —O—, —NH— or —$NE_4$- groups or mixtures thereof and which can be unsubstituted or substituted by one or more —OH, —$OE_4$ or —$NH_2$, or mixtures thereof; or $E_{22}$, $E_{23}$, $E_{24}$, $E_{25}$ and $E_{26}$ are independently phenyl, —OH, —$OCOE_{11}$, —$OE_{29}$, —NCO, —$NHCOE_{11}$, or —$NE_7E_8$, cyano, nitro, perfluoroalkyl of 1 to 12 carbon atoms, —$COG_3$, —$COOG_3$, —$CON(G_3)_2$, —$CONHG_3$, $E_3S$—, $E_3SO$—, $E_3SO_2$—, —$P(O)(C_6H_5)_2$, —$P(O))OG_3)_2$, —$SO_2$—$X_1$-$E_{29}$;

$X_1$ is —O—, —NH— or —$NE_4$-.

$E_{29}$ is straight or branched chain alkyl of 1 to 24 carbon atoms, straight or branched chain alkenyl of 2 to 18 carbon atoms, said alkyl or said alkenyl substituted by one or more —OH, —$OCOE_{11}$, —$OE_4$, —NCO, —$NHCOE_{11}$, —$NE_7E_8$, phthalimido,

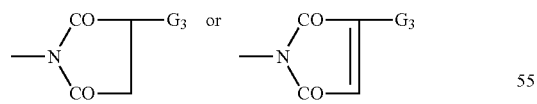

or mixtures thereof, where $E_4$ is straight or branched chain alkyl of 1 to 24 carbon atoms or alkenyl of 2 to 18 carbon atoms; or said alkyl or said alkenyl interrupted by one or more —O—, —NH— or —$NE_4$- groups or mixtures thereof and which can be unsubstituted or substituted by one or more —OH, —$OE_4$ or —$NH_2$, or mixtures thereof; or $E_{29}$ is phenyl or phenylalkyl of 7 to 15 carbon atoms, or said phenyl or said phenylalkyl substituted by one to three alkyl groups of 1 to 4 carbon atoms;

$E_2$ and $E_9$ are independently hydrogen, straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by one to three alkyl of 1 to 4 carbon atoms or by one or more of the following groups -$T_1$-$Si(OR_2)_n$$(R_1)_{3-n}$, -$T_1$-X—CO—X-$T_2$-$Si(OR_2)_n$$(R_1)_{3-n}$, -$T_1$-CO—X-$T_2$-$Si(OR_2)_n$$(R_1)_{3-n}$, —X-$T_1$-$Si(OR_2)_n$$(R_1)_{3-n}$ or —X-$T_1$-X—CO—X-$T_2$-$Si(OR_2)_n$$(R_1)_{3-n}$; or $E_2$ and $E_9$ are independently said alkyl of 1 to 24 carbon atoms or said alkenyl of 2 to 18 carbon atoms substituted by one or more —OH, —$OCOE_{11}$, —$OE_4$, —NCO, —$NH_2$, —$NHCOE_{11}$, —$NHE_4$ or —$N(E_4)_2$, or mixtures thereof, where $E_4$ is straight or branched chain alkyl of 1 to 24 carbon atoms; or said alkyl or said alkenyl interrupted by one or more —O—, —NH— or —$NE_4$- groups or mixtures thereof and which can be unsubstituted or substituted by one or more —OH, —$OE_4$ or —$NH_2$ groups or mixtures thereof; or $E_1$, $E_2$ and $E_9$ are also independently -$T_1$-$Si(OR_2)_n$$(R_1)_{3-n}$, -$T_1$-X—CO—X-$T_2$-$Si(OR_2)_n$$(R_1)_{3-n}$ or -$T_1$-CO—X-$T_2$-$Si(OR_2)_n$$(R_1)_{3-n}$;

$E_{11}$ is hydrogen, straight or branched chain alkyl of 1 to 18 carbon atoms, straight or branched chain alkenyl of 2 to 18 carbon atoms, cycloalkyl of 5 to 12 carbon atoms, aryl of 6 to 14 carbon atoms or phenylalkyl of 7 to 15 carbon atoms;

L is alkylene of 1 to 12 carbon atoms, alkylidene of 2 to 12 carbon atoms, benzylidene, p-xylylene, cycloalkylidene of 5 to 12 carbon atoms or $\alpha,\alpha,\alpha',\alpha'$-tetramethyl-m-xylylene;

$E_3$ is alkyl of 1 to 20 carbon atoms, said alkyl substituted by alkoxycarbonyl of 2 to 9 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms;

$E_5$ and $E_8$ are independently the same as $E_2$; or $E_5$ and $E_8$ are independently hydrogen, —X-$E_1$, —X—CO-$E_2$, —X—CO—$X_1$, —X-$T_1$-$Si(OR_2)_n$$(R_1)_{3-n}$ or —X-$T_1$-X—CO—X-$T_2$-$Si(OR_2)_n$$(R_1)_{3-n}$;

$X_1$ is —NH-$E_4$ or —X-$E_2$;

with the proviso that at least one of $G_2$, $G_7$, $E_1$, $E_2$, $E_5$, $E_8$ and $E_9$ contains a group -$T_1$-$Si(OR_2)_n$$(R_1)_{3-n}$, -$T_1$-X—CO—X-$T_2$-$Si(OR_2)_n$$(R_1)_{3-n}$, -$T_1$-CO—X-$T_2$-$Si(OR_2)_n$$(R_1)_{3-n}$, —X-$T_1$-$Si(OR_2)_n$$(R_1)_{3-n}$ or —X-$T_1$-X—CO—X-$T_2$-$Si(OR_2)_n$$(R_1)_{3-n}$; where $T_1$ and $T_2$ are independently alkylene of 1 to 18 carbon atoms or alkylene-phenylene-alkylene of 8 to 20 carbon atoms, and $R_1$ and $R_2$ are independently alkyl of 1 to 18 carbon atoms, cycloalkyl of 5 to 12 carbon atoms, aryl of 6 to 10 carbon atoms or phenylalkyl of 7 to 20 carbon atoms, preferably alkyl of 1 to 3 carbon atoms or phenyl, and n is 1, 2 or 3.

Preferably, the new benzotriazole is a compound of formula (IA) or (IIA).

Formulae (IA) and (IIA)

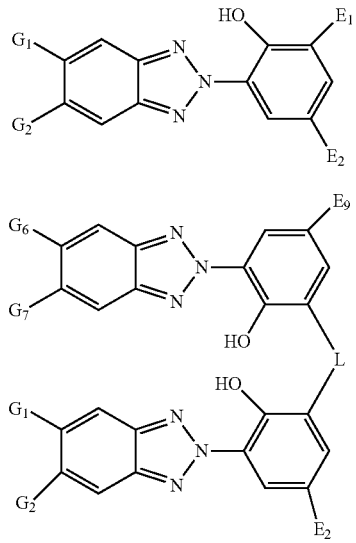

Where:
G₁ and G₆ are hydrogen;
G₂ and G₇ are independently H, cyano, CF₃—, fluoro, —CO-G₃, or E₃SO₂—, or G₇ is also hydrogen;
G₃ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;
E₁ is phenylalkyl of 7 to 15 carbon atoms, phenyl, or said phenyl or said phenylalkyl substituted on the phenyl ring by 1 to 4 alkyl groups of 1 to 4 carbon atoms each;
E₂ and E₉ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or E₂ is said alkyl of 1 to 24 carbon atoms or said alkenyl of 2 to 18 carbon atoms substituted by one or more —OH, —OCOE₁₁, —OE₄, —NCO, —NH₂, —NHCOE₁₁, —NHE₄ or —N(E₄)₂, or mixtures thereof, where E₄ is straight or branched chain alkyl of 1 to 24 carbon atoms; or said alkyl or said alkenyl interrupted by one or more —O—, —NH—, or —NE₄-groups or mixtures thereof and which can be unsubstituted or substituted by one or more —OH, —OE₄, or —NH₂ groups or mixtures thereof;
E₁₁ is hydrogen, straight or branched chain alkyl of 1 to 18 carbon atoms, straight or branched chain alkenyl of 2 to 18 carbon atoms, cycloalkyl of 5 to 12 carbon atoms, aryl of 6 to 14 carbon atoms or phenylalkyl of 7 to 15 carbon atoms;
E₃ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyls of 1 to 4 carbon atoms or 1,1,2,2-tetrahydroperfluoroalkyl where the perfluoroalkyl moiety is of 6 to 16 carbon atoms;
L is methylene; and
with the proviso that at least one of E₁, E₂ and E₉ contains a group -T₁-Si(OR₂)ₙ(R₁)₃₋ₙ, -T₁-X—CO—X-T₂-Si(OR₂)ₙ(R₁)₃₋ₙ, -T₁-CO—X-T₂-Si(OR₂)ₙ(R₁)₃₋ₙ, —X-T₁-Si(OR₂)ₙ(R₁)₃₋ₙ or —X-T₁-X—CO—X-T₂-Si(OR₂)ₙ(R₁)₃₋ₙ;
where T₁ and T₂ are independently alkylene of 2 or 3 carbon atoms, and R₁ and R₂ are independently alkyl of 1 to 6 carbon atoms or phenyl, and n is 1, 2, or 3.

Another preferred embodiment of the invention is a compound of formula (IA).

Compound of Formula (IA)

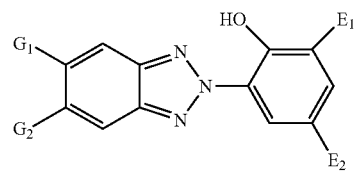

wherein:
G₁ is hydrogen;
G₂ is H, CF₃—, fluoro or E₃SO₂—;
E₁ is hydrogen or straight or branched alkyl of 2 to 24 carbon atoms;
E₂ is as defined above; and
E₃ is straight or branched chain alkyl of 1 to 7 carbon atoms;
with the proviso that E₂ contains a group -T₁-Si(OR₂)ₙ(R₁)₃₋ₙ, -T₁-X—CO—X-T₂-Si(OR₂)ₙ(R₁)₃₋ₙ, -T₁-CO—X-T₂-Si(OR₂)ₙ(R₁)₃₋ₙ, —X-T₁-Si(OR₂)ₙ(R₁)₃₋ₙ or —X-T₁-X—CO—X-T₂-Si(OR₂)ₙ(R₁)₃₋ₙ; where T₁ and T₂ are independently alkylene of 2 or 3 carbon atoms, and R₁ and R₂ are independently alkyl of 1 to 6 carbon atoms or phenyl, and n is 1, 2 or 3.

Preferably, the compound of formula (IA, IIA) is
(a) 2-[2-hydroxy-3-(3-triethoxysilyl) propyl-5-tert-octylphenyl]-2H-benzo-triazole;
(b) 2-{2-hydroxy-3-tert-butyl-5-[3-(3-triethyoxysilyl) propylcarbamoyloxy)-propyl] phenyl}2H-benzotriazole;
(c) 2-{2-hydroxy-3-tert-butyl-5-[2-(3-triethyoxysilyl) propylcarbamoyl-oxy) ethyl]phenyl}-2H-benzotriazole;
(d) 2-{2-hydroxy-5-[2-(3-triethyoxysilyl) propyl-carbamoyloxy) ethyl]-phenyl}-2H-benzotriazole;
(e) 2-{2-hydroxy-3-α-cumyl-5-[2-(3-triethyoxysilyl) propylcarbamoyl-oxy) ethyl] phenyl}-2H-benzotriazole;
(f) 2-{2-hydroxy-3-tert-butyl-5-[2-(3-(diethoxymethylsilyl) propylamino-carbonylethyl] phenyl}-2H-benzotriazole;
(g) 2-{2-hydroxy-3-tert-butyl-5-[3-(2-ethoxydimethylsilyl) ethylcarbonyl-oxy) propyl] phenyl}-2H-benzotriazole;
(h) 2-{2-hydroxy-3-tert-butyl-5-[2-(3-ethoxydimethylsilyl) propyl-oxycarbonyl) ethyl] phenyl}-2H-benzotriazole;
(i) 2-[2-hydroxy-3-(ethoxydimethylsilyl) propyl-5-tert-octylphenyl]-2H-benzotriazole;
(j) 5-[3-(diethoxyethylsilyl) propoxycarbonyl]-2-(2-hydroxy-3-α-cumyl-5-tert-octyl-phenyl)-2H-benzotriazole;

(k) 5-[3-(diethoxyethylsilyl) propylaminocarbonyl]-2-(2-hydroxy-3-α-cumyl-5-tert-octyl-phenyl)-2H-benzotriazole;
and the following structures:
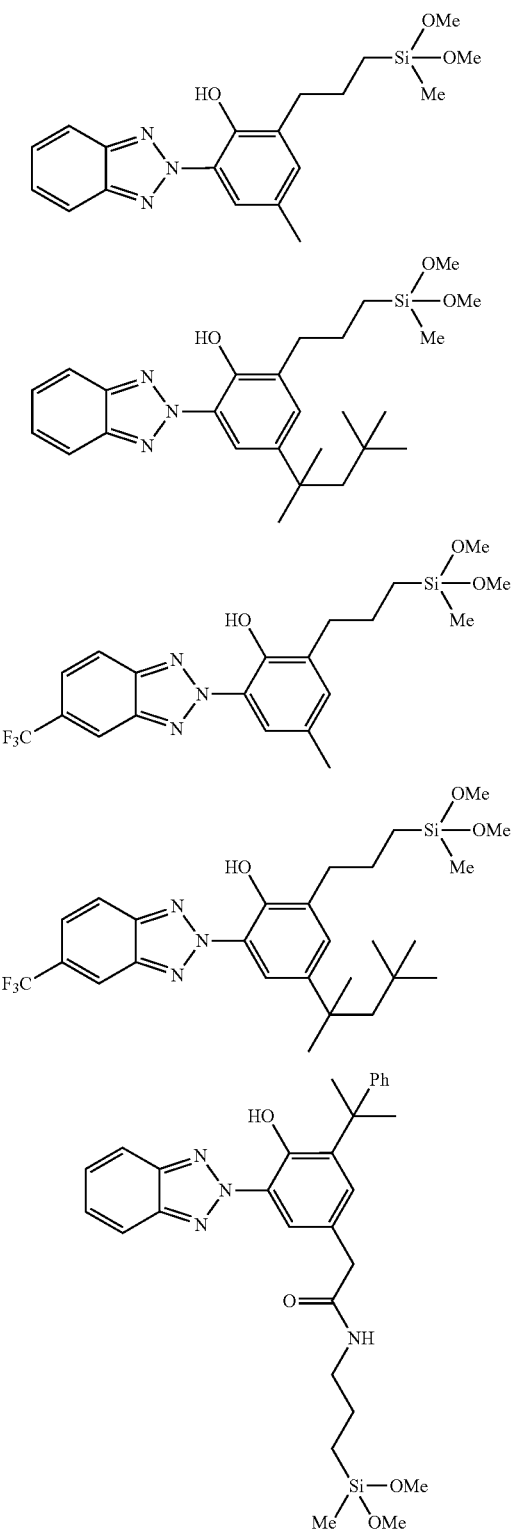
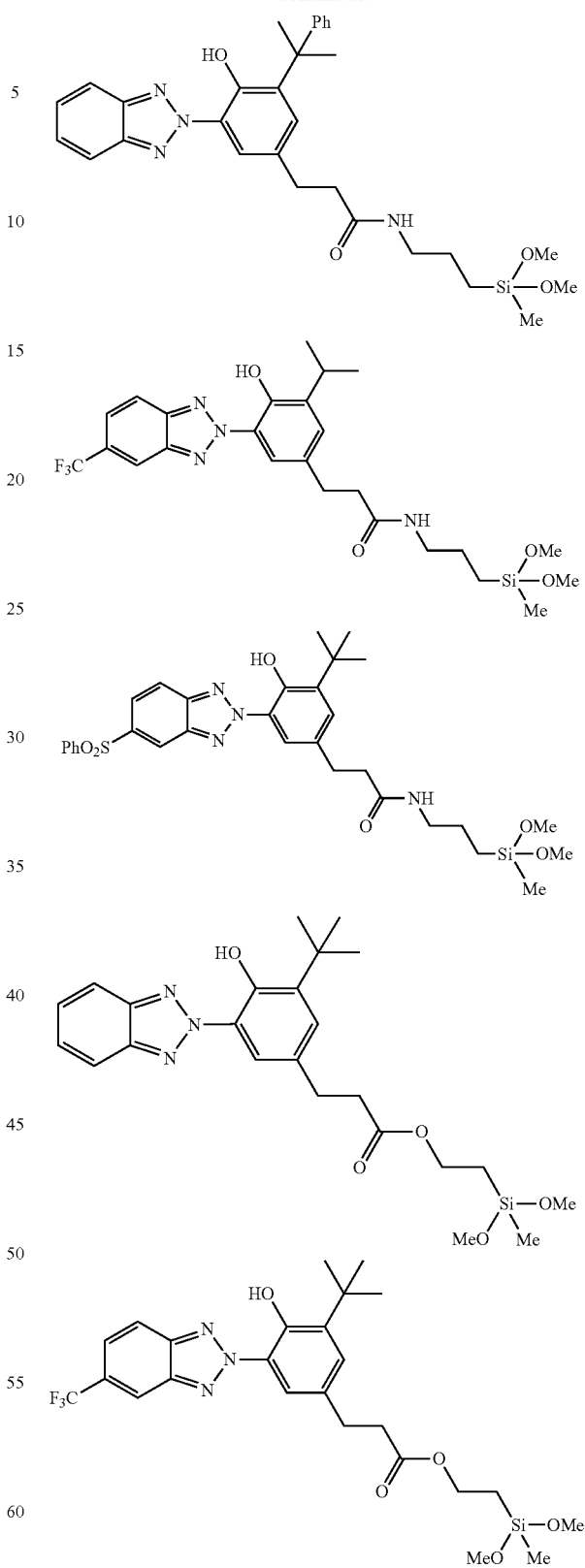

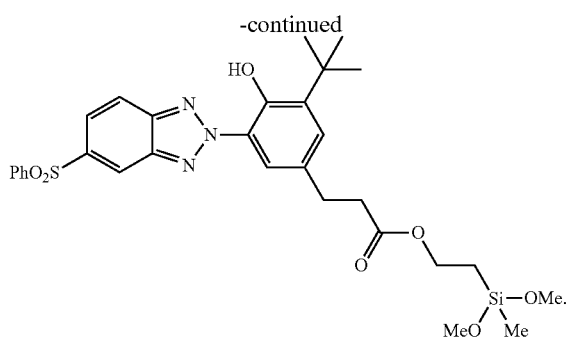

Silyl Functional Triazine UV Absorbers:

The dielectric enhancement fluid and hydrosilylation gel compositions, and methods of using same of the invention may comprise and use triazines of formula (VIa) or (VIb).

Formulae (VIa) and (VIb)

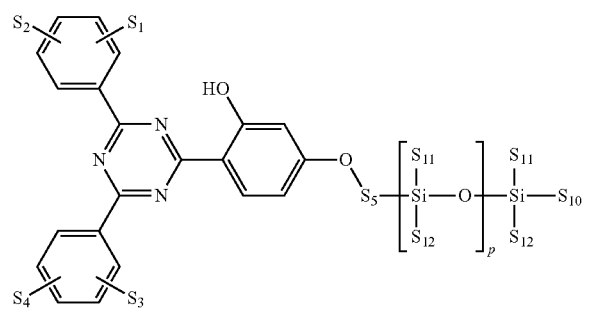

(VIa)

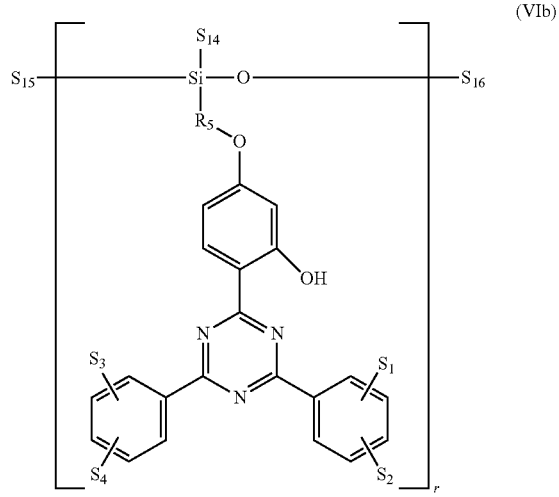

(VIb)

Where:
  p is 0 or an integer from 1-50, r is an integer from 1-50, $S_1$ and $S_3$ are each independently of the other hydrogen, OH, $C_1$-$C_{12}$ alkyl or cyclohexyl, $S_2$ and $S_4$ are each independently of the other hydrogen, OH, $C_1$-$C_{12}$ alkyl, $C_1$-$C_{18}$ alkoxy, halogen or a group —O—(VII),

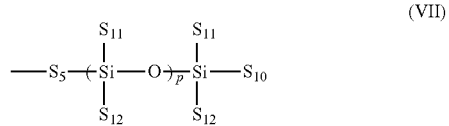

$S_5$ is a direct bond or a divalent group of one of the following formulae: —$C_mH_{2m}$—, —$(CH_2)_m$—O—, —$(CH_2)_m$—O—$S_6$—, —$(CH_2)_m$—CO—X—$(CH_2)_n$—, —$(CH_2)_m$—CO—X—$(CH_2)_n$—O—,

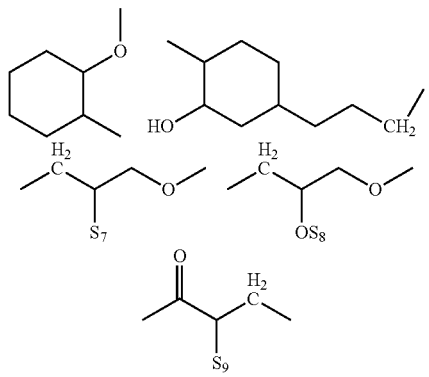

—$CH_2$—CH(OH)—$CH_2$—Y—$(CH_2)_m$—, wherein m and n are each independently of the other 1-4, $S_6$ is $C_1$-$C_{12}$ alkylene, cyclohexylene or phenylene, $S_7$ is $C_1$-$C_{12}$ alkyl, $C_5$-$C_8$ cycloalkyl, phenyl, $C_2$-$C_{13}$ alkoxymethyl, $C_6$-$C_9$ cycloalkoxymethyl or phenoxymethyl, $S_8$ is a group of formula II, $S_9$ is hydrogen or methyl, X is —O— or —$NS_{13}$—, wherein $S_{13}$ is hydrogen, $C_1$-$C_{12}$ alkyl, phenyl or a group —$(CH_2)_3$—II or —$(CH_2)_3$—O—II, Y is —O— or —NH—, $S_{10}$, $S_{11}$ and $S_{12}$ are each independently of one another $C_1$-$C_{18}$ alkyl, cyclohexyl, phenyl or $C_1$-$C_{18}$ alkoxy, and, if $S_2$ and $S_4$ are not a group —O—II, $S_{10}$ and/or $S_{11}$ may also be a group of formula (VIII) below:

Formula (VIII)

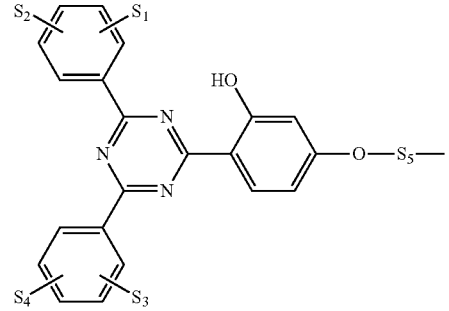

$S_{14}$ is $C_1$-$C_{12}$ alkyl, $C_5$-$C_8$ cycloalkyl or phenyl, and $S_{15}$ is hydroxy or $C_1$-$C_4$ alkoxy and $S_{16}$ is hydrogen or $C_1$-$C_4$ alkyl or, if r is greater than 2, $S_{15}$ and $S_{16}$ together may be a direct bond;
One of the substituents $S_1$, $S_2$, $S_3$, $S_4$, $S_7$, $S_8$, and $S_{14}$ in formula (VIa) or formula (VIb) as $C_1$-$C_{12}$ alkyl may be a linear or branched alkyl group. Typical examples of such groups are methyl, ethyl, n-propyl, isopropyl, n-butyl, tert-butyl, pentyl, hexyl, octyl, 2-ethylhexyl, nonyl, decyl or dodecyl. $S_{10}$, $S_{11}$, and $S_{12}$ as $C_1$-$C_{18}$ alkyl may additionally be tetradecyl, hexadecyl or octadecyl;

$S_7$ and $S_{14}$ as $C_5$-$C_8$ cycloalkyl may be cyclopentyl, cyclohexyl or cyclooctyl, preferably cyclohexyl;

$S_2$, $S_4$, $S_{10}$, $S_{11}$, and $S_{12}$ as $C_1$-$C_{18}$ alkoxy may be linear or branched alkoxy groups. Exemplary of such groups are methoxy, ethoxy, isopropoxy, butoxy, hexoxy, octyloxy, decyloxy, dodecyloxy or octadecyloxy;

$S_{10}$, $S_{11}$, and $S_{12}$ are preferably $C_1$-$C_4$ alkyl or $C_1$-$C_4$ alkoxy, and $S_{14}$ is preferably $C_1$-$C_4$ alkyl;

$S_6$ as $C_1$-$C_{12}$ alkylene may be a linear or branched alkylene group. Such groups are typically methylene, dimethylene, 1,2-propylene, trimethylene, 2,2-dimethyltrimethylene, tetramethylene, hexamethylene, octamethylene, or dodecamethylene;

Preferred compounds of formula (VIa) are those wherein $S_5$ is a direct bond or a divalent group of one of the following formulae: —$(CH_2)_m$—, —$(CH_2)_m$—O—, —$(CH_2)_m$—O—$R_6$—, —$(CH_2)_m$—CO—X—$(CH_2)_n$—, —$(CH_2)_m$—CO—X—$(CH_2)_n$—O—,

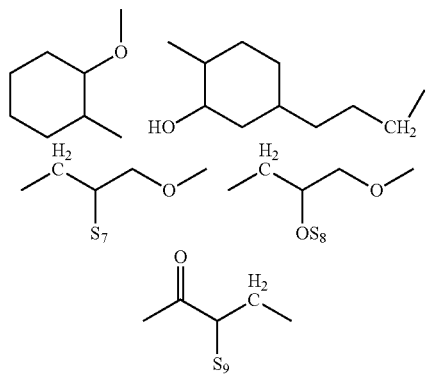

—$CH_2$—CH(OH)—$CH_2$—Y—$(CH_2)_m$—, wherein m and n are each independently of the other 1-4.

Also preferred are compounds of formula (VIa) or (VIb) wherein $S_1$, $S_2$, $S_3$ and $S_4$ are each independently of one another hydrogen or methyl. Especially preferred compounds are -(2-hydroxyphenyl)-s-triazines of formula (VIa) or formula (VIb) which are substituted in the 4- and 6-position by a phenyl, p-tolyl or 2,4-dimethylphenyl group.

The novel compounds preferably carry at the silicon atom $C_1$-$C_8$ alkyl, phenyl or $C_1$-$C_8$ alkoxy as substituents $S_{10}$, $S_{11}$ and $S_{12}$, and $C_1$-$C_8$ alkyl or phenyl as $S_{14}$, or $S_{10}$ and/or $S_{11}$ is a group of formula (VIII). Compounds wherein $S_{10}$, $S_{11}$ and $S_{12}$ are $C_1$-$C_4$ alkyl or $C_1$-$C_4$ alkoxy and $S_{14}$ is $C_1$-$C_4$ alkyl are especially preferred.

The hydroxyphenyltriazine group is linked to the silyl radical through the group $S_5$.

Preferably $S_5$ is a group —$C_mH_{2m}$—, —$(CH_2)_m$—O—, —$(CH_2)_m$—CO—X—$(CH_2)_n$—,

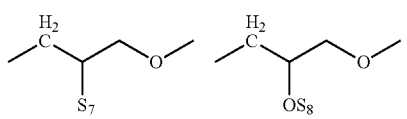

or —$CH_2$—CH(OH)—$CH_2$—Y—$(CH_2)_m$—, wherein m is 1, 2 or 3, $S_7$ is methyl, phenyl, $C_3$-$C_9$ alkoxymethyl or phenoxymethyl, $S_8$ is a group of formula VII and X and Y are each oxygen.

Particularly preferred compounds of formula VIa or VIb are those wherein $S_5$ is a group —$C_mH_{2m}$—, —$(CH_2)_2$—O—, —$CH_2$—CO—O—$CH_2$—, —$CH_2$—CH(O—$C_4H_9$)—O—,

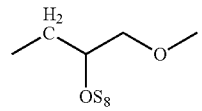

or —$CH_2$—CH(OH)—$CH_2$—O—$(CH_2)_3$—, m is an integer 1, 2 or 3, and $S_8$ is a radical

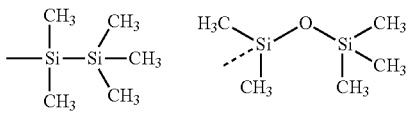

The compounds of formula (VIa), wherein p is 0, are especially preferred.

Compounds of formula VIa or VIb, wherein $S_1$, $S_2$, $S_3$ and $S_4$ are each in o- and/or p-position, p is 0, $S_5$ is —$(CH_2)_3$—, $S_{10}$ is methyl or ethyl, $S_{11}$ and $S_{12}$ are ethyl or ethoxy, $S_{14}$ is methyl, $S_{15}$ is —OH, methoxy or ethoxy, $S_{16}$ is hydrogen, methyl or ethyl, and, if r is greater than 2, $S_{15}$ and $S_{16}$ together may be a direct bond, are also especially preferred.

The following compounds are representative examples of compounds of formula (VIa):

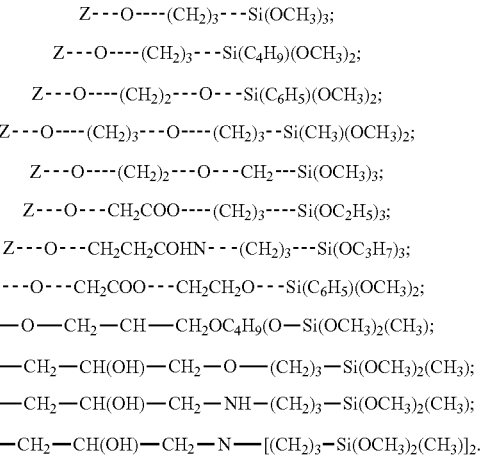

In the above formula, Z is a group.

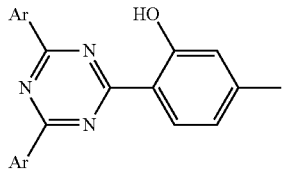

Where:

Ar is phenyl, p-tolyl or 2,4-dimethylphenyl.

The synthesis of the compounds of formula (VIa) depends on the respective linking group $S_5$ through which the triazinyl group and the silyl group are attached. Possible syntheses are set out below for each type of $S_5$.

1) If $S_5$ is a group $—C_mH_{2m}—$:

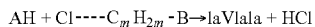

Where:

A is a triazine group of formula

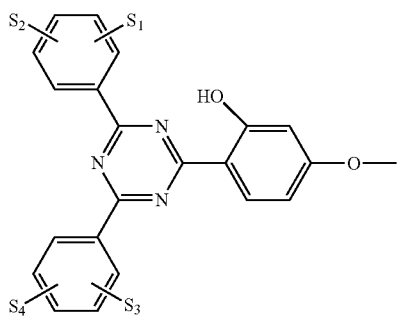

and B is a silyl group of formula

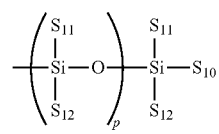

An alternative synthesis proceeds according to the scheme:

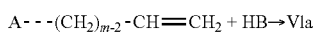

2) If $S_5$ is a group $—(CH_2)_m—O—$:

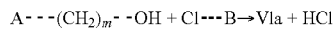

3) If $S_5$ is a group $—(CH_2)_m—O—S_6—$:

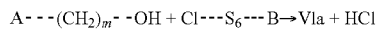

4) If $S_5$ is a group $—(CH_2)_m—CO—X—(CH_2)—$:

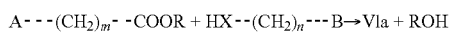

R=$C_1$-$C_2$ alkyl

5) If $S_5$ is a group $—(CH_2)_m—CO—X—(CH_2)_n—O—$:

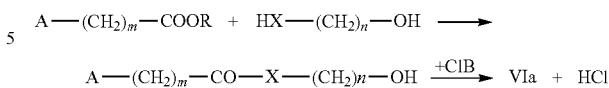

6) If $S_5$ is a group

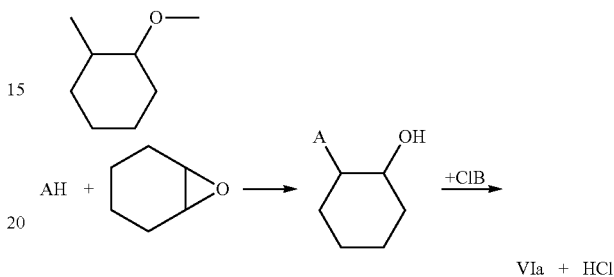

7) If $S_5$ is a group $—CH_2—CH(S_7)—O—$:

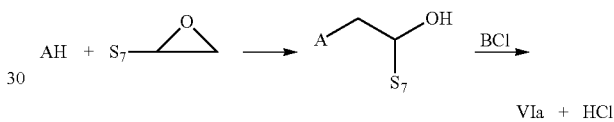

8) If $S_5$ is a group $—CH_2—CH(OR_8)—CH_2O—$:

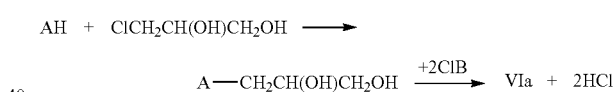

9) If $S_5$ is a group

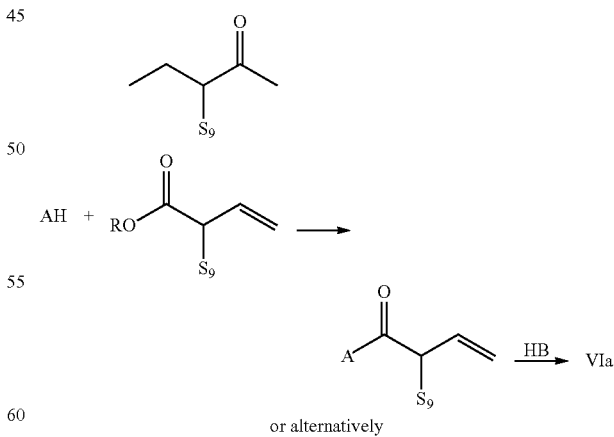

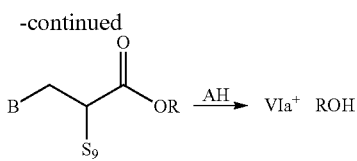

10) If $S_5$ is a group —$CH_2$—$CH(OH)$—$CH_2$—Y—$(CH_2)_n$—:

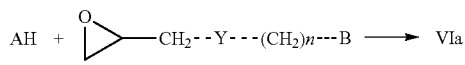

Silyl Functional Hindered Amine Light Stabilizers:

The dielectric enhancement fluid and hydrosilylation gel compositions, and methods of using same of the invention may comprise and use tetramethyl piperidine-based compounds of the formula (XI).

Formula (XI):

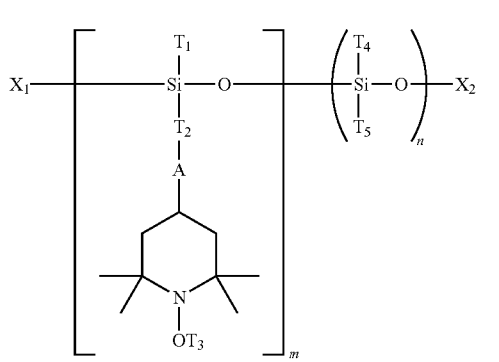

(XI)

Where:
m+n is a number from 1 to 100 and n varies from zero to 90% of the sum of m+n, A is —O— or

Where:
$T_6$ is hydrogen, $C_1$-$C_{18}$ alkyl or a group of the formula (XII)

Formula (XII)

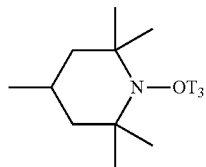

(XII)

and $T_4$ which can be identical or different are $C_1$-$C_8$ alkyl, phenyl, $C_1$-$C_8$ alkoxy, OH, ONa or OK,
$T_2$ is $C_2$-$C_{12}$ alkylene or also a direct bond if A is —O— and $T_1$ and $T_4$ are $C_1$-$C_8$ alkyl or phenyl, $T_3$ is $C_1$-$C_{18}$ alkyl, $C_5$-$C_{12}$ cycloalkyl, $C_2$-$C_{18}$ alkenyl, $C_5$-$C_{12}$ cycloalkenyl, $C_7$-$C_{12}$ aralkyl, a saturated or unsaturated radical of a bicyclic or tricyclic $C_7$-$C_{12}$ hydrocarbon or $C_6$-$C_{10}$ aryl which is unsubstituted or substituted by $C_1$-$C_8$ alkyl, $T_5$ is hydrogen, $C_1$-$C_{18}$ alkyl, $C_5$-$C_{12}$ cycloalkyl or phenyl, $X_1$ is as defined for Ti or is a group $(T_7)_3$ SiO— with $T_7$ being $C_1$-$C_8$ alkyl, $X_2$ is hydrogen, Na, K, $C_1$-$C_8$ alkyl, a group $(T_7)_3$-Si— or, if n is zero and $T_1$ and $X_1$ are $C_1$-$C_8$ alkyl or phenyl, $X_2$ is also a group of the formula (XIII).

Formula (XIII)

(XIII)

and, if m+n is a number from 3 to 10, $X_1$ and $X_2$ together can also be a direct bond.

Each of the groups A, $T_1$, $T_2$, $T_3$, $T_4$ and $T_5$ can, in the single recurring units of the formula (XI), have the same definition or different definitions and, if the compounds of the present invention are copolymeric, they may have a random distribution or a block distribution of the various recurring units.

Examples of alkyl having not more than 18 carbon atoms are methyl, ethyl, propyl, isopropyl, butyl, 2-butyl, isobutyl, t-butyl, pentyl, 2-pentyl, isopentyl, hexyl, heptyl, octyl, 2-ethylhexyl, t-octyl, nonyl, decyl, undecyl, dodecyl, tridecyl, tetradecyl, hexadecyl and octadecyl.

Examples of $C_1$-$C_8$ alkoxy are methoxy, ethoxy, propoxy, isopropoxy, butoxy, isobutoxy, t-butoxy, pentoxy, isopentoxy, hexoxy, heptoxy and octoxy.

Examples of $C_5$-$C_{12}$ cycloalkyl are cyclopentyl, cyclohexyl, methylcyclohexyl, cycloheptyl, cyclooctyl, cyclodecyl and cyclododecyl. $C_5$-$C_{12}$ cycloalkyl also covers a saturated cyclic hydrocarbon radical of 5 to 8 carbon atoms, which is substituted by $C_1$-$C_4$ alkyl.

Examples of $C_2$-$C_{18}$ alkenyl are vinyl, allyl, 2-methylallyl, butenyl, pentenyl, hexenyl, heptenyl, octenyl, decenyl, dodecenyl, tetradecenyl, hexadecenyl and octadecenyl.

Examples of $C_5$-$C_{12}$ cycloalkenyl are cyclopentenyl, cyclohexenyl, methylcyclohexenyl, cycloheptenyl, cyclooctenyl, cyclodecenyl and cyclododecenyl. $C_5$ $C_{12}$ cycloalkenyl also covers an unsaturated cyclic hydrocarbon radical of 5 to 8 carbon atoms, which is substituted by $C_1$-$C_4$ alkyl.

Examples of $C_7$-$C_{12}$ aralkyl are benzyl, α-methylbenzyl, α,α-dimethylbenzyl and phenylethyl. $C_7$-$C_9$ phenylalkyl is preferred.

Examples of saturated or unsaturated radicals of a bicyclic or tricyclic $C_7$-$C_{12}$ hydrocarbon are bicycloheptyl, bicycloheptenyl, decahydronaphthyl, tetrahydronaphthyl and tricyclodecyl.

Examples of $C_6$-$C_{10}$ aryl, which is unsubstituted or substituted by alkyl are phenyl, methylphenyl, dimethylphenyl, trimethylphenyl, isopropylphenyl, naphthyl and methylnaphthyl.

Examples of $C_2$-$C_{12}$ alkylene are ethylene, propylene, trimethylene, 2-methyltrimethylene, tetramethylene, pentamethylene, hexamethylene, octamethylene, decamethylene, undecamethylene and dodecamethylene. Trimethylene is preferred.

Those compounds of the formula (XI) are preferred in which m+n is a number from 1 to 80, n varies from zero to 90% of the sum m+n, A is —O— or

Where:
- $T_6$ is hydrogen, $C_1$-$C_{12}$ alkyl or a group of the formula (XII),
- $T_1$ and $T_4$ which can be identical or different are $C_1$-$C_6$ alkyl, phenyl, $C_1$-$C_6$ alkoxy, OH, ONa or OK,
- $T_2$ is $C_2$-$C_8$ alkylene or also a direct bond if A is —O— and $T_1$ and $T_4$ are $C_1$-$C_6$ alkyl or phenyl,
- $T_3$ is $C_1$-$C_{18}$ alkyl, $C_5$-$C_8$ cycloalkyl, $C_3$-$C_{12}$ alkenyl, $C_5$-$C_8$ cycloalkenyl, $C_7$-$C_9$ aralkyl, a saturated or unsaturated radical of a bicyclic or tricyclic $C_7$-$C_{10}$ hydrocarbon or $C_6$-$C_{10}$ aryl which is unsubstituted or substituted by $C_1$-$C_4$ alkyl,
- $T_5$ is hydrogen, $C_1$-$C_{18}$ alkyl, $C_5$-$C_8$ cycloalkyl or phenyl,
- $X_1$ is as defined for $R_1$ or is a group $(T_7)_3$ SiO— with $T_7$ being $C_1$-$C_6$ alkyl,
- $X_2$ is hydrogen, Na, K, $C_1$-$C_6$ alkyl, a group $(T_7)_3$ Si— or, if n is zero and $T_1$ and $X_1$ are $C_1$-$C_6$ alkyl or phenyl, $X_2$ is also a group of the formula (XIII) and, if m+n is a number from 3 to 10, $X_1$ and $X_2$ together can also be a direct bond.

Those compounds of the formula (I) are particularly preferred in which m+n is a number from 1 to 60, n varies from zero to 90% of the sum of m+n, A is —O— or

Where:
- $T_6$ is hydrogen or $C_1$-$C_8$ alkyl,
- $T_1$ and $T_4$ which can be identical or different are $C_1$-$C_4$ alkyl, phenyl, $C_1$-$C_4$ alkoxy, OH, ONa or OK,
- $T_2$ is $C_2$-$C_6$ alkylene or also a direct bond if A is —O— and $T_1$ and $T_4$ are $C_1$-$C_4$ alkyl or phenyl,
- $T_3$ is $C_1$-$C_{16}$ alkyl, $C_5$-$C_7$ cycloalkyl, $C_3$-$C_6$ alkenyl, $C_5$-$C_7$ cycloalkenyl, benzyl, α-methylbenzyl, α,α-dimethylbenzyl, bicycloheptyl, bicycloheptenyl, decahydronaphthyl or tetrahydronaphthyl,
- $T_5$ is hydrogen, $C_1$-$C_{16}$ alkyl, cyclohexyl or phenyl,
- $X_1$ is as defined for $R_1$ or a group $(T_7)_3$ SiO— with $T_7$ being $C_1$-$C_4$ alkyl,
- $X_2$ is hydrogen, Na, K, $C_1$-$C_4$ alkyl, a group $(T_7)_3$ Si— or, if n is zero and $T_1$ and $X_1$ are $C_1$-$C_4$ alkyl or phenyl, $X_2$ is also a group of the formula (XIII) and, if m+n is a number from 3 to 10, $X_1$ and $X_2$ together can also be a direct bond.

Those compounds of the formula (I) are of special interest in which m+n is a number from 1 to 50, n varies from zero to 75% of the sum m+n, A is —O— or

Where:
- $T_6$ is hydrogen or $C_1$-$C_4$ alkyl,
- $T_1$ and $T_4$ which can be identical or different are $C_1$-$C_3$ alkyl, $C_1$-$C_3$ alkoxy or OH,
- $T_2$ is $C_2$-$C_4$ alkylene or is also a direct bond if A is —O— and Ti and $T_4$ are $C_1$-$C_3$ alkyl,
- $T_3$ is methyl, $C_6$-$C_{12}$ alkyl, cyclopentyl, cyclohexyl, methylcyclohexyl or α-methylbenzyl,
- $T_5$ is hydrogen, $C_1$-$C_{14}$ alkyl or cyclohexyl,
- $X_1$ is as defined for $R_1$ or is a group $(R_7)_3$ SiO— with $T_7$ being $C_1$-$C_3$ alkyl,
- $X_2$ is hydrogen, $C_1$-$C_3$ alkyl, a group $(R_7)_3$ Si— or, if n is zero and $T_1$ and $X_1$ are $C_1$-$C_3$ alkyl,
- $X_2$ is also a group of the formula (XIII) and, if m+n is a number from 3 to 10, $X_1$ and $X_2$ together can also be a direct bond.

Those compounds of the formula (I) are of particular interest in which m+n is a number from 1 to 40, n varies from zero to 50% of the sum m+n,
- A is —O—,
- $T_1$ and $T_4$ which can be identical or different are methyl, methoxy, ethoxy or OH,
- $T_2$ is trimethylene or is also a direct bond if A is —O— and $T_1$ and $T_4$ are methyl,
- $T_3$ is methyl, $C_7$-$C_9$ alkyl or cyclohexyl,
- $T_5$ is $C_1$-$C_{12}$ alkyl,
- $X_1$ is as defined for Ti or is a group $(CH_3)_3$ SiO—, and
- $X_2$ is hydrogen, methyl, ethyl, a group $(CH_3)_3$ Si— or, if n is zero and Ti and $X_1$ are methyl,
- $X_2$ is also a group of the formula (XIII) and, if m+n is a number from 3 to 10, $X_1$ and $X_2$ together can also be a direct bond.

The compounds of the present invention may be prepared by various processes known per se.

If $T_2$ is $C_2$-$C_{12}$ alkylene, the compounds of the formula (I) can be prepared, for example, by hydrolytic polycondensation of compounds of the formulae (XIVa) and (XIVb).

Formulae (XIVa) and (XIVb)

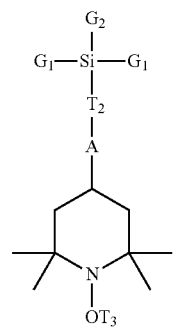

(XIVa)

-continued

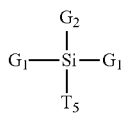
(XIVb)

Where:
G$_1$ is Cl or C$_1$-C$_8$ alkoxy and G$_2$ is Cl, C$_1$-C$_8$ alkoxy or phenyl, as reported, for example, in U.S. Pat. No. 4,946,880, or, if T$_1$ and T$_4$ are C$_1$-C$_8$ alkyl or phenyl, by reaction of a compound of the formula (XV):

Formula (XV)

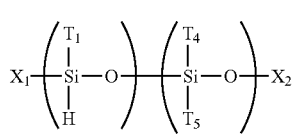
(XV)

with a compound of the formula (XVI)

Formula (XVI)

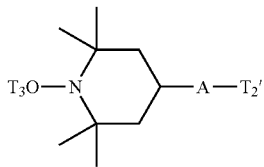
(XVI)

with T$_2$' being C$_2$-C$_{12}$ alkenyl, in the presence of catalytic quantities of the Pt or Rh complex as described, for example, in U.S. Pat. No. 5,051,458 and EP Patent 388 321.

If T$_2$ is a direct bond, the compounds of the formula (I) can be prepared, for example, by reacting a compound of the formula (V) with a piperidinol of the formula (XVII):

Formula (XVII)

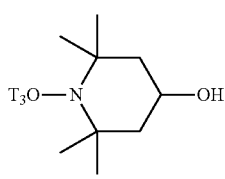
(XVII)

in the presence of catalytic quantifies of a complex of Pt, Rh, or Pd, as described, for example, in U.S. Pat. No. 4,895,885.

The compounds of the formula (XV) are commercially available or can be prepared by known processes. The compounds of the formula (XVI) are prepared, for example, as indicated in U.S. Pat. No. 4,946,880, the group T$_3$ O— in the 1-position of the piperidyl group being introduced according to the processes disclosed in U.S. Pat. No. 4,921,962.

The compounds of the formula (XVII) are prepared, for example, as reported in U.S. Pat. No. 5,021,481.

Silyl Functional Antioxidants:

The dielectric enhancement fluid and hydrosilylation gel compositions, and methods of using same of the invention may comprise and use silyl functional antioxidant compounds containing the sterically hindered phenolic group:

Phenolic groups (XVIII) and (XVIIIa)

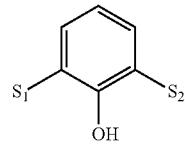
(XVIII)

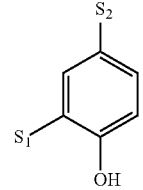
(XVIIIa)

Where:
S$_1$ and S$_2$, which can be equal or different, are preferably branched alkyl radicals containing from 1 to 10 carbon atoms, and in their most preferred form are tert-butyl radicals; said phenolic groups (XVIII) and (XVIIIa) carrying a silyl functionality hydrolysable to silanol. More particularly, the reactive antioxidant compounds of the present invention may pertain to the following class of compounds:

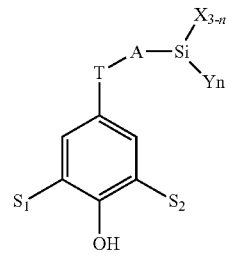
(XIX)

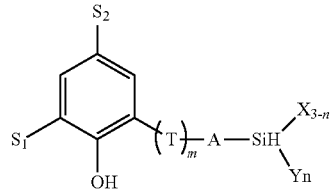
(XIXa)

Where:
S$_1$ and S$_2$ are as heretofore defined; m is zero or one. T is oxygen or sulfur
A is a linear or branched alkylene radical containing from 1 to 10 carbon atoms, or can be defined by means of

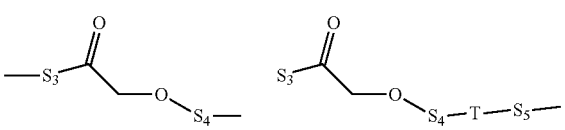

—S₄—T—S₅—

(where $S_3$, $S_4$ and $S_5$ are linear or branched alkylene radicals containing a total of between 3 and 10 carbon atoms);

X is a linear or branched alkyl radical containing from 1 to 5 carbon atoms, and preferably the methyl radical.

Y is hydrogen, halogen and preferably chlorine, $C_1$-$C_4$ acyloxy, $C_1$-$C_4$ alkyloxy, amino, amino-oxy or silyloxy, and preferably $C_1$-$C_2$ alkyloxy.

n is one, two, or three.

Specific examples of reactive antioxidant compounds which fall within formula (XIX) are the following:

Formulae (XX) and (XXI)

(XX)

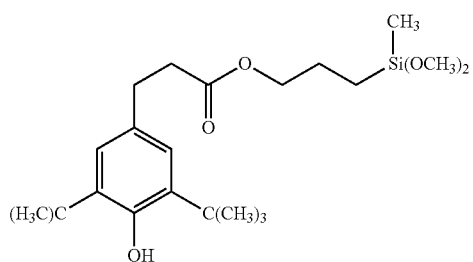

(XXI)

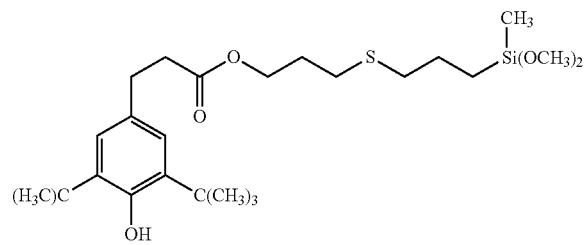

The reactive antioxidant compounds (XX) and (XXI) and can be obtained from the compound (XXII):

Compound (XXII)

(XXII)

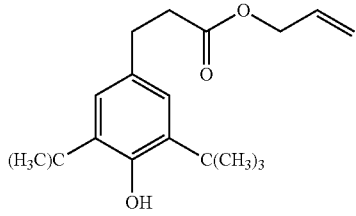

by hydrosilylation with methyldimethoxysilane, and g-mercaptopropyltrimethoxysilane respectively. A further specific example of a reactive antioxidant compound falling within formula (XIX) is the following:

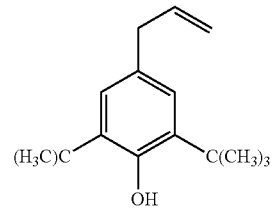

The reactive antioxidant compound above can be obtained by hydrosilylation of the compound:

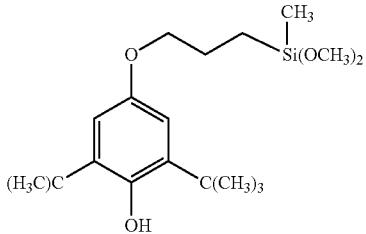

with methyldimethoxysilane.

A further example of a reactive antioxidant compound falling within general formula (XIX) is the following:

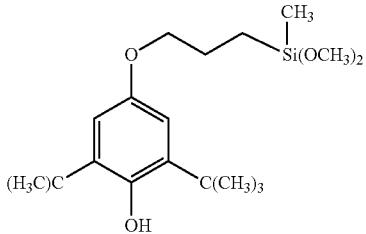

The reactive antioxidant compound above can be obtained by hydrosilylation with methyldimethoxy silane of the compound:

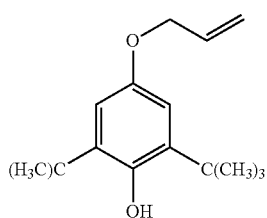

In general, the reactive antioxidant compounds of the present invention may be prepared by silylating a sterically hindered phenol carrying on its ring a preferably terminal ethylenically unsaturated group or by subjecting said ethylenically unsaturated group to alkene hydrothiolation.

One class of hydrosilylation agents suitable for this purpose is definable by the formula (XXIII):

Formula (XXIII)

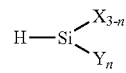
(XXIII)

A class of hydrothiolation agents suitable for the purpose is definable by the general formula (XXIV):

Formula (XXIV):

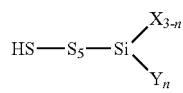
(XXIV)

Where:
$S_5$, X, Y and n have the aforesaid meanings.

Specific examples of hydrosilylation agents falling within general formula (XXIII) are:

$HSi(OCH_3)_2Cl$; $HSi(OCH_3)Cl_2$; $HSiCl_3$;
$HSi(OCH_3)_2(CH_3)$; $HSi(CH_3)(OC_2H_5)_2$;
$HSi(OC_2H_5)_3$; $H_2Si(C_2H_5)_2$;
$HSi(OCH_3)_3$; $HSi(CH_3)_2\text{-O-}Si(CH_3)_2H$;
$HSi(CH_3)_2\text{-O-}Si(CH_3)(OCH_3)_2$;
$HSi(CH_3)_2ONC(CH_3)_2$;
$HSi(CH_3)[ONC(CH_3)_2]_2$ Specific examples of hydrothiolation agents which fall within general formula (XXIV) are γ-mercaptopropyltrialkoxysilanes and in particular g-mercaptopropyltrimethoxysilane.

The hydrosilylation reaction is conveniently conducted at a temperature of between 0° and 200° C., and preferably between ambient temperature (20°25° C.) and 120° C., with a reagent quantity varying from stoichiometric to an excess of the hydrosilylation reagent. Said excess usually reaches up to 20% on a molar basis. However, if disilanes are used it is convenient to use a large excess of the hydrosilylation agent, for example up to about 10 times the stoichiometric quantity. The hydrosilylation reaction is catalyzed by metal catalysts, by ultraviolet radiation and by radical initiators. The preferred catalysts are platinum compounds and complexes of platinum with olefins, preferably chloroplatinic acid. In the case of platinum catalysts, the catalyst concentration, evaluated as metal, can vary from 1 to 200 parts per million and preferably from 5 to 50 parts per million in the reaction medium.

The hydrosilylation reaction can be conducted in an inert (unreactive) organic solvent, normally chosen from aliphatic, cycloaliphatic, and aromatic hydrocarbons and ethers, which are liquid under the operating conditions. Specific examples of solvents suitable for this purpose are heptane, cyclohexane, toluene, tetrahydrofuran, dioxane and dimethoxyethane. The reaction times depend on the reagents used and the reaction temperature and vary normally from 0.5 to 10 hours. On termination of the hydrosilylation reaction, any solvent used, and any excess hydrosilylation agent are removed by stripping, and the reactive stabilizing compound is recovered from the residue of said stripping by normal methods such as crystallization and distillation under vacuum. However, generally the high yield and selectivity of the hydrosilylation reaction make any separation or purification of the final required product unnecessary. If hydrosilylation compounds falling within formula (XXIV) are used, the reaction is conveniently conducted under the aforesaid general hydrosilylation conditions with catalysts in the form of azo compounds such as azobisisobutyronitrile, which are used in a quantity of between 0.1% and 10% and preferably between 0.5% and 2% in the reaction environment. The reactive antioxidant compounds of the present invention may hydrolyze at the silyl function under mild conditions, to generate silanol groups which can be condensed together to form complex resinous stabilizing structures. These resinous structures, of silicone resin type, preserve the inherent stabilizing characteristics of sterically hindered phenols, and have a high level of compatibility with organic polymers, and practically no extractability from said polymers. Hydrolysis at the silyl function takes place simply by contact with water or with environmental moisture at ambient temperature (20°-25° C.) or lower than ambient. Condensation between the silanol groups to give the complex resinous structures can be facilitated by acid or basic agents, soaps, or metal esters, and organometal compounds, especially of lead and tin. Preferred catalysts for this purpose are tin dibutyl tin dilaurate, and strong sulfonic acids such as dodecyl benzenesulfonic acid. Conveniently, the catalyst quantity can vary from 0.1% to 10% by weight and preferably from 0.2% to 3% by weight with respect to the reactive antioxidant compound subjected to resinification. Said resinification reaction can be conducted at ambient temperature (20°–25° C.) or at higher or lower than ambient. The complex resinous structures thus obtained can be introduced into the organic polymer to be stabilized by the usual methods used for this purpose. According to a further embodiment of the present invention, the reactive antioxidant compounds may be introduced directly into the organic polymer, within which the hydrolysis reaction at the silyl function and the interaction between the silanol groups take place spontaneously, to thus give the stabilized polymer composition. According to a further embodiment, hydrolysis at the silyl function of the reactive antioxidant compounds takes place externally to the polymer, together with partial resinification of the hydrolysis products thus obtained. The product of the partial resinification is then introduced into the organic polymer to be stabilized, within which complete resinification takes place.

WORKING EXAMPLES

The following working examples are for illustrative purposes only and are not to be construed to limit the scope of the instant invention in any manner whatsoever. Examples 1-6 describe typical synthetic examples of the instant invention, and Example 7 describes permeation and exudation experiments demonstrating the substantial advantages of a representative functional acyl metallocene compound (11-(dimethoxymethylsilyl)-1-oxo-undecyl-1-ferrocene (AcylFc-DMS)).

Example 1

11-Dimethoxymethyl Silyl Undecanoyl Ferrocene was Synthesized

Preparation of 10-undecenoyl ferrocene.

To a solution of ferrocene (20.0 g, 0.107 mol) in dichloromethane was added zinc oxide (9.68 g, 0.118 mol, 1.1 eq) with stirring. 10-Undecenoyl chloride (65.4 g, 0.3225 mol)

was then added slowly over a period of 1 h to the reaction while maintaining the reaction temperature around room temperature. The reaction was then stirred at room temperature for 2 h. The contents of the reaction were washed with ice water, followed by treatment with aqueous NaOH with stirring for 1 h. The organic layer was washed again with water and dried over $MgSO_4$. Removal of solvent left 35.7 g (94%) of the desired product as a dark red oil, with consistent NMR (proton and carbon) spectra.

Hydrosilylation of 10-Undecenoyl Ferrocene.

A solution of 10-undecenoyl ferrocene (35.6 g, 0.101 mol), in toluene was stirred and heated to 55° C. The catalyst solution (0.36 mL, Karstedt's catalyst, 5% in toluene, Hereaus) was added all at once, followed by dropwise addition of dimethoxy methyl silane (13.0 g, 0.123 mol, 1.2 eq), over 40 minutes, while maintaining the reaction temperature at or below 65° C. After completion of addition, the reaction mixture was heated at 60° C. for 6 h, and then stirred overnight at room temperature. Removal of solvent led to 42.8 g of the desired product (92%) as a red oil, with consistent NMR (proton and carbon) spectra.

Examples 2-6 were prepared as above, using ferrocene, dimethoxy methyl silane and the appropriate acid chlorides.

Example 2

12-Dimethoxymethyl Silyl Dodecanoyl Ferrocene was Synthesized

The title compound is synthesized using the above procedure of Example 1 using ferrocene, with 11-dodecenoyl chloride as the acylating agent.

Example 3

10-Dimethoxymethyl Silyl Decanoyl Ferrocene was Synthesized

The title compound is synthesized using the above procedure of Example 1 using ferrocene, with 9-decenoyl chloride as the acylating agent.

Example 4

9-Dimethoxymethyl Silyl Nonanoyl Ferrocene was Synthesized

The title compound is synthesized using the above procedure of Example 1 using ferrocene, with 8-nonenoyl chloride as the acylating agent.

Example 5

6-Dimethoxymethyl Silyl Hexanoyl Ferrocene was Synthesized

The title compound is synthesized using the above procedure of Example 1 using ferrocene, with 5-hexenoyl chloride as the acylating agent.

Example 6

4-Dimethoxymethyl Silyl Butanoyl Ferrocene was Synthesized

The title compound is synthesized using the above procedure of Example 1 using ferrocene, with 3-butenoyl chloride as the acylating agent.

Example 7

Substantial Advantages of Representative Compound 11-(dimethoxymethylsilyl)-1-oxo-undecyl-1-ferrocene (AcylFc-DMS) were Demonstrated Using Permeation and Exudation Experiments Performance Deficits of Ferrocene and n-Butylferrocene.

Ferrocene has three potential drawbacks to its use in cable rejuvenation fluids. Ferrocene is a solid under typical conditions, so it is difficult to handle in an industrial setting, and its solubility in polyethylene insulation is limited. These two issues can be addressed with a simple ferrocene derivative such as n-butylferrocene, which is liquid at room temperature and is much more soluble in polyethylene than ferrocene. The third drawback to ferrocene is that its relatively high diffusion rate leads to loss of the material from the interior and insulation of an electrical cable over a few months. n-Butylferrocene also diffuses rapidly.

Silane Functional Acyl Metallocene Compounds.

In contrast to a simple ferrocene derivative such as n-butylferrocene, the silylacylferrocene compounds of the present invention overcome all three drawbacks of ferrocene.

Figure 2:
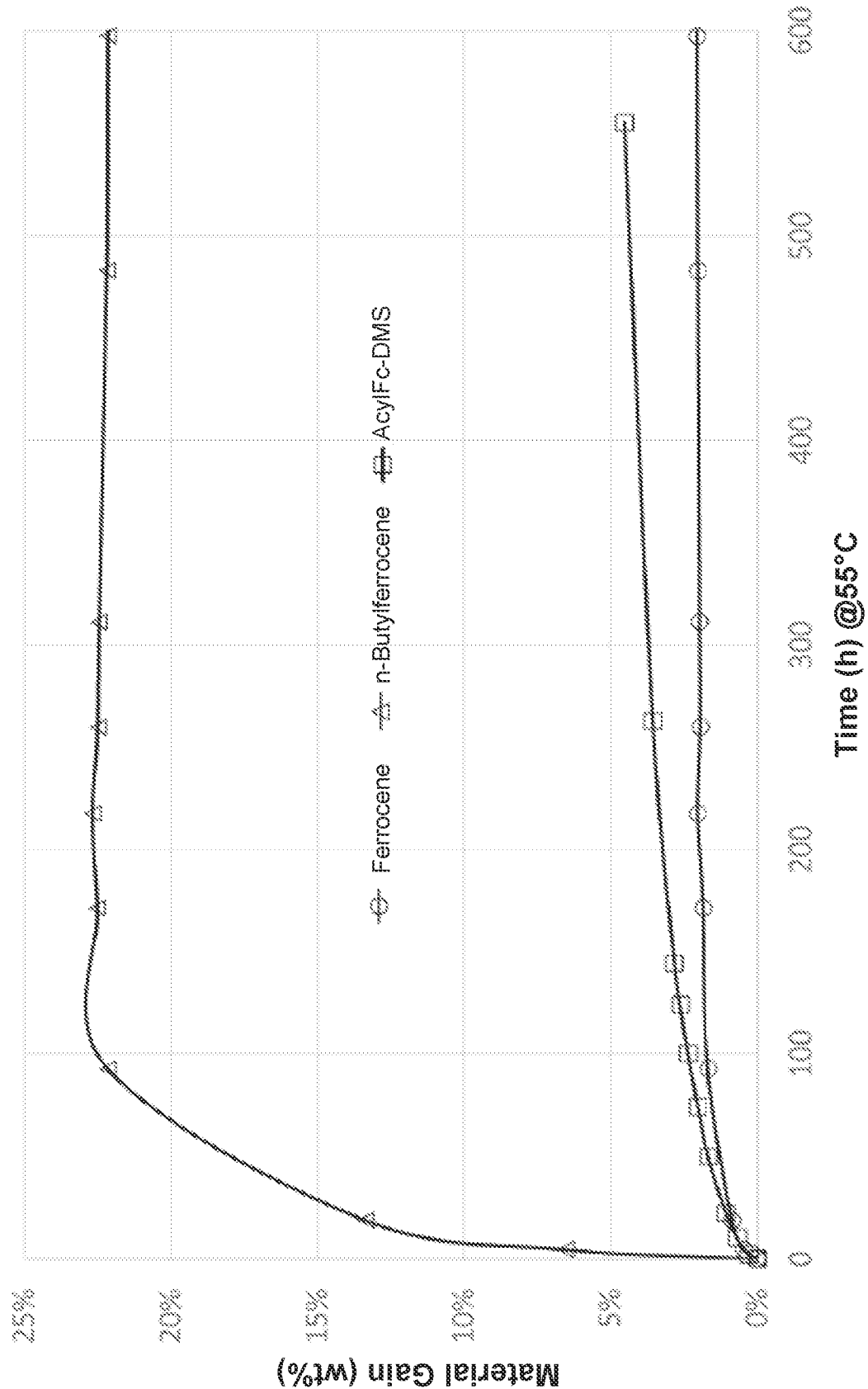
FIG. 2 shows, according to exemplary aspects of the present invention, results of permeation experiments in which polyethylene disks were immersed in solid ferrocene, liquid n-butylferrocene, and liquid 11-(dimethoxymethylsilyl)-1-oxo-undecyl-1-ferrocene (AcylFc-DMS).

Permeation experiments were conducted in which polyethylene disks were immersed in solid ferrocene, liquid n-butylferrocene, and liquid 11-(dimethoxymethylsilyl)-1-oxo-undecyl-1-ferrocene (AcylFc-DMS). 1.6 cm diameter- 0.25 cm thickness disks of LLDPE were soaked in each material at 55° C. The disks are withdrawn periodically, wiped to remove excess material, and weighed to determine weight gain due to absorption of the respective ferrocene materials. Results are shown in FIG. 2. AcylFc-DMS is more soluble than ferrocene in polyethylene, approaching 5 wt %.

Figure 3:
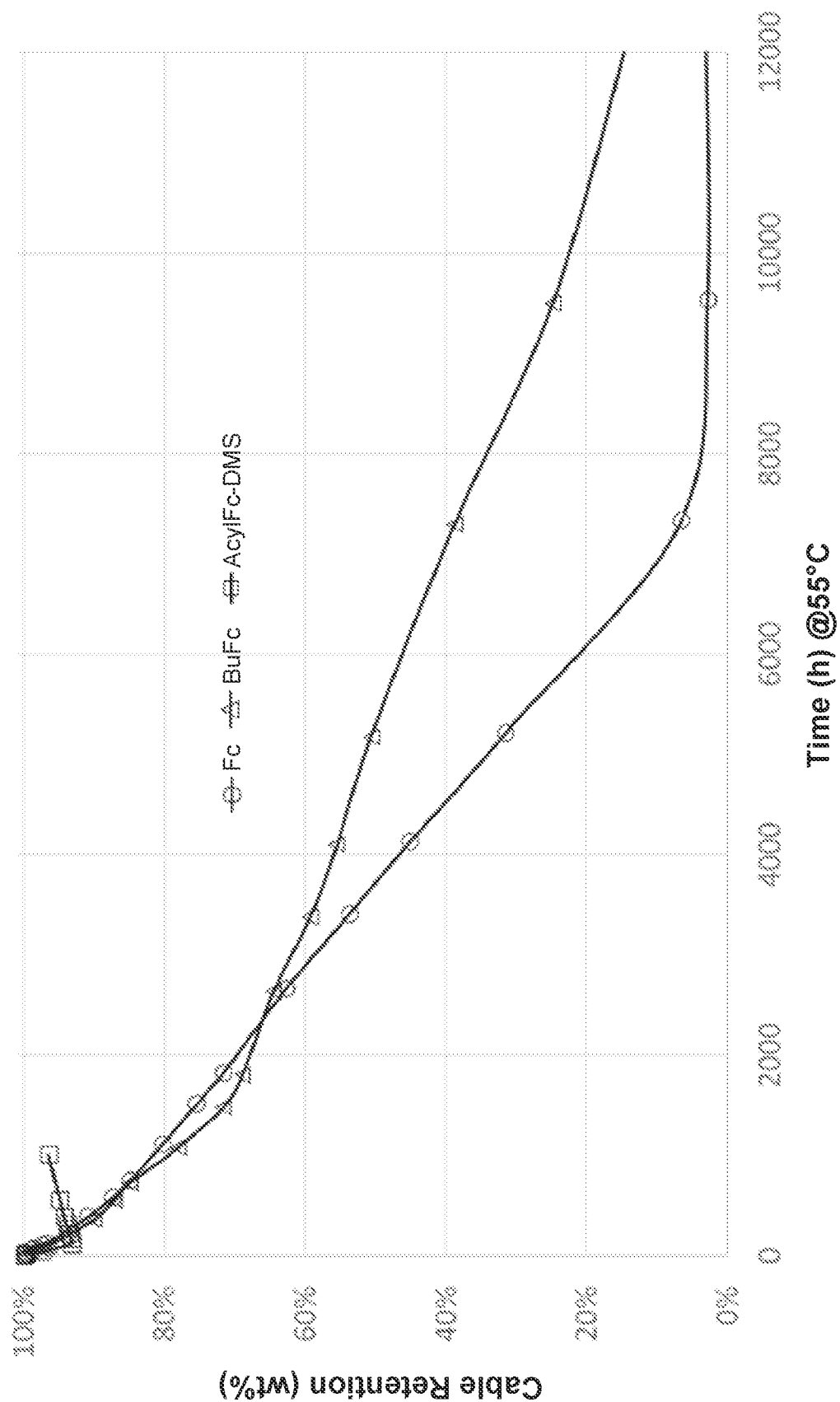
FIG. 3 shows, according to exemplary aspects of the present invention, exudation experiments measuring material loss of ferrocene, n-butylferrocene and AcylFc-DMS at 55° C. from the exterior of polyethylene tubes.

Exudation experiments with the three materials were also conducted by filling a 1/8" O.D.-1/16" I.D. polyethylene tube with the test material, sealing the ends of the tube, and soaking the tube in water at 55° C. DDBSA was added at 0.3 wt % to the AcylFc-DMS sample to effect hydrolysis and condensation. Samples were periodically removed, wiped dry, and weighed. Comparison of the tube weight with the original weight provides a graph of material loss from the exterior of the tube as shown in FIG. 3.

The AcylFc-DMS exudation curve shows an initial weight loss due to the methanol liberated when the silane is hydrolyzed, but after that, no further weight loss occurs. In stark contrast, ferrocene is steadily lost until it is almost completely gone, and n-butylferrocene behaves similarly but at a slower rate.

Figure 4:
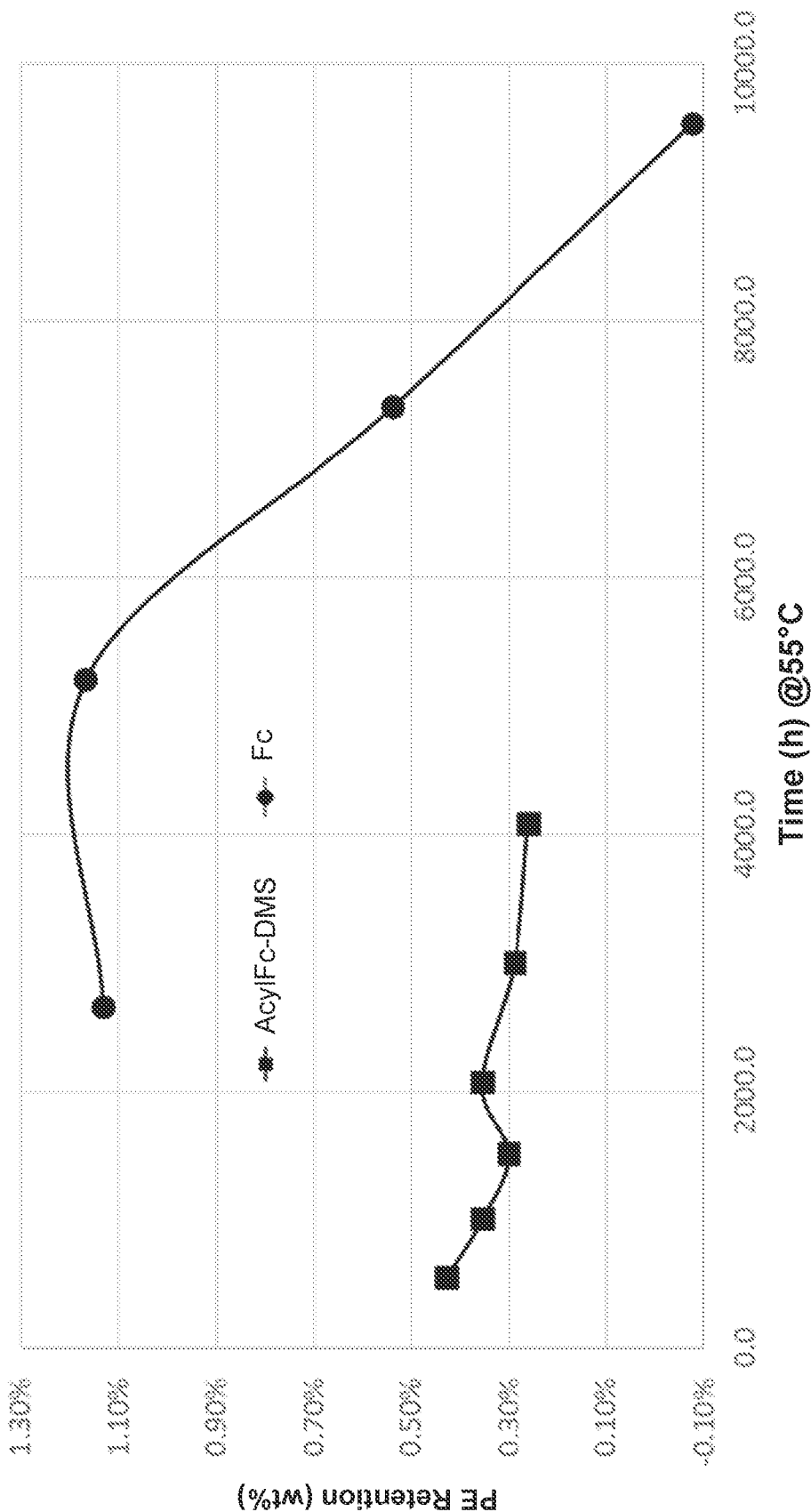
FIG. 4 shows, according to exemplary aspects of the present invention, polyethylene retention of ferrocene and AcylFc-DMS at 55° C., as part of the exudation experiments of FIG. 3.

The exudation experiments also quantify the amount of material actually dissolved in the polyethylene of the tube by periodically removing a tube, cleaning out the interior, and comparing the weight of the tube with its original weight. As shown in FIG. 4, the ferrocene level dissolved in the polyethylene of the tube is initially above 1 wt %, but over time, it is completely lost while the reactive AcylFc-DMS forms high weight oligomers in the polyethylene and is not lost.

The invention claimed is:

1. An acyl metallocene compound of formula (1):

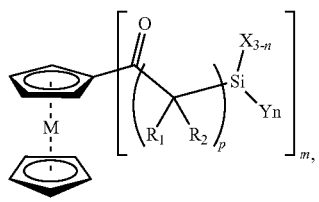

wherein:
M is a metal ion selected from Fe(II), Mn(II), Ni(II), Co(II), Ru(II), or Os(II);
m is 1-4, where a silane acyl groups group(s) can be at any position(s) on one or both of the cyclopentadienyl rings;
p can vary from 2 to 20 carbon atoms;
$R_1$ and $R_2$ are $C_1$-$C_4$ linear or branched alkyl, or H;
X is a $C_1$-$C_5$ linear or branched alkyl;
Y is $C_1$-$C_4$ acyloxy, $C_1$-$C_4$ alkyloxy, or silyloxy; and
wherein for m=1, n is two or three, and for m=2-4, n is one, two, or three.

2. The compound of claim 1, wherein for formula (1): M is Fe(II).

3. The compound of claim 2, wherein for formula (1): M is Fe(II); m is 1-2; R1 and R2 are C1-C2 alkyl or H; X is C1-C2 alkyl; and Y is C1-C4 alkyloxy.

4. The compound of claim 3, wherein for formula (1): M is Fe(II); m is 1; R1 and R2 are H; X is —CH3; and Y is C1-C2 alkyloxy.

5. The compound of claim 1, wherein the compound is selected from the group consisting of:

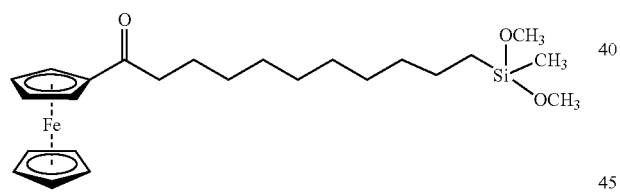

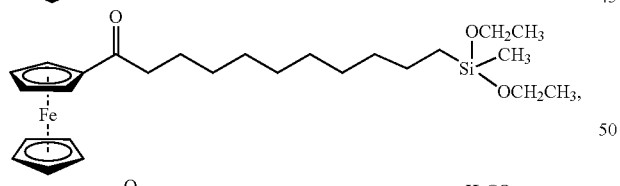

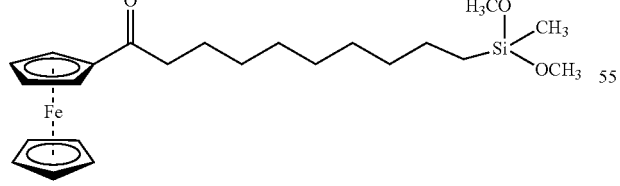

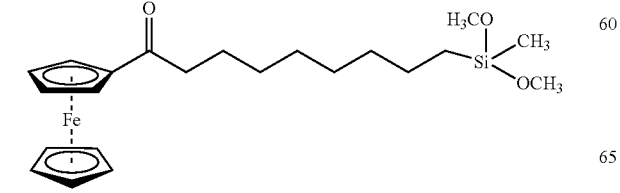

-continued

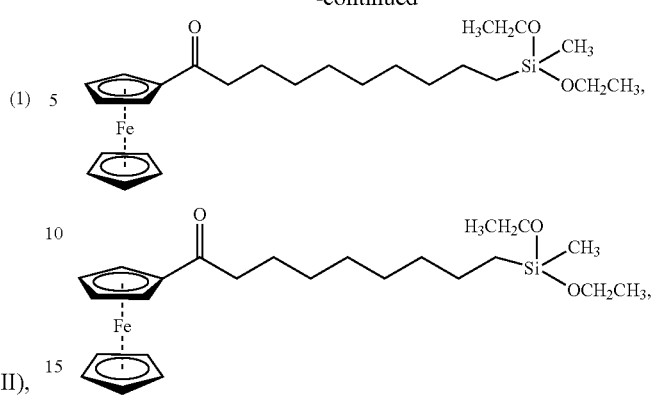

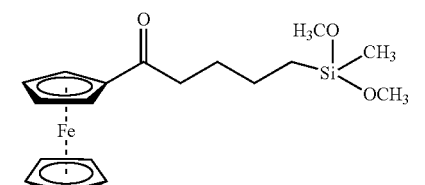

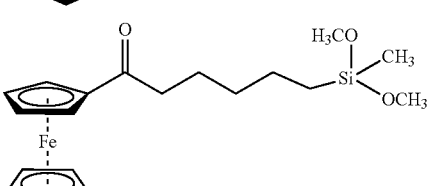

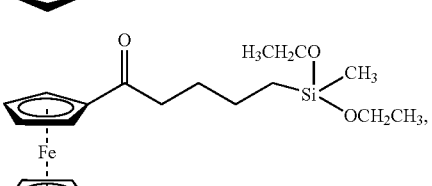

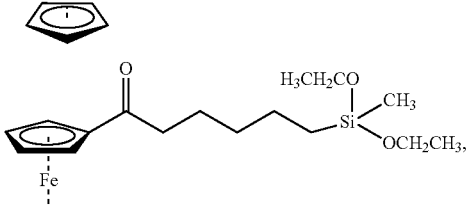

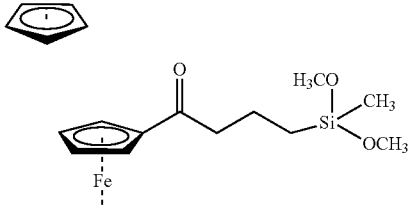

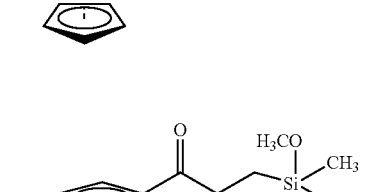

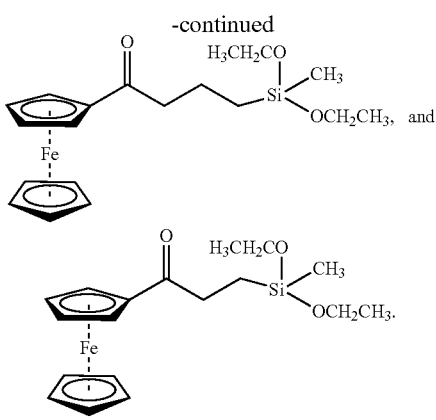

6. The compound of claim 5, wherein the compound is 11-(dimethoxymethylsilyl)-1-oxo-undecyl-1-ferrocene (AcylFc-DMS), or 3-(dimethoxymethylsilyl)-1-oxo-propyl-1-ferrocene.

7. A dielectric enhancement fluid, comprising:
(a) an acyl metallocene compound of formula (1):

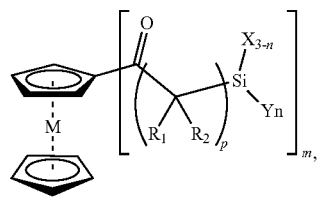

wherein:
M is a metal ion selected from Fe(II), Mn(II), Ni(II), Co(II), Ru(II), or Os(II);
m is 1-4, where a silane acyl group(s) can be at any position(s) on one or both of the cyclopentadienyl rings;
p can vary from 2 to 20 carbon atoms;
R1 and R2 are C1-C4 linear or branched alkyl, or H;
X is a C1-C5 linear or branched alkyl;
Y is C1-C4 acyloxy, C1-C4 alkyloxy, or silyloxy; and
wherein for m=1, n is two or three, and for m=2-4, n is one, two, or three; and
(b) at least one component selected from:
(1) at least one a water-reactive material selected from:
(i) an organosilane monomer having at least two water-reactive groups,
(ii) the organosilane monomer (1) wherein at least one of the water-reactive groups is substituted with a condensable silanol group,
(iii) an oligomer of the above organosilane monomer (I), and/or
(iv) a co-oligomer of the above organosilane monomer (i) with a different organosilane monomer;
(2) a non-water-reactive organic material having a diffusion coefficient of less than about 10-9 cm2/sec and an equilibrium concentration of at least about 0.005 gm/cm3 in a polymeric insulation, the diffusion coefficient and the equilibrium concentration being determined at temperature T;
(3) metallocenes having a metal ion selected from Fe(II), Mn(II), Ni(II), Co(II), Ru(II), or Os(II), sandwiched between two cyclopentadienyl rings, and derivatives thereof;
(4) an organic compound having an equilibrium concentration in the polymeric insulation at 55° C., which is less than 2.25 times the equilibrium concentration at 22° C.;
(5) at least one silane functional additive derived from:
(i) a hindered phenolic antioxidant based on 2,6-di-tert-butyl phenol,
(ii) a hindered amine light stabilizer, based on tetramethyl piperidine, and/or
(iii) a UV absorber or energy quencher selected from benzotriazoles, triazines, benzophenones, and/or nickel chelates; and/or
(6) at least one catalyst suitable to catalyze hydrolysis and condensation of the water reactive materials of (a), (1), and (5).

8. The dielectric enhancement fluid of claim 7, wherein the catalyst is a strong acid, or a compound of titanium and/or tin.

9. The dielectric enhancement fluid of claim 7, wherein for formula (1): M is Fe(II).

10. The dielectric enhancement fluid of claim 9, wherein for formula (1): M is Fe(II); m is 1-2; R1 and R2 are C1-C2 alkyl or H; X is C1-C2 alkyl; and Y is C1-C4 alkyloxy.

11. The dielectric enhancement fluid of claim 10, wherein for formula (1): M is Fe(II); m is 1; R1 and R2 are H; X is —CH3; and Y is C1-C2 alkyloxy.

12. The dielectric enhancement fluid of claim 11, wherein for formula (1) the compound is selected from the group consisting of:

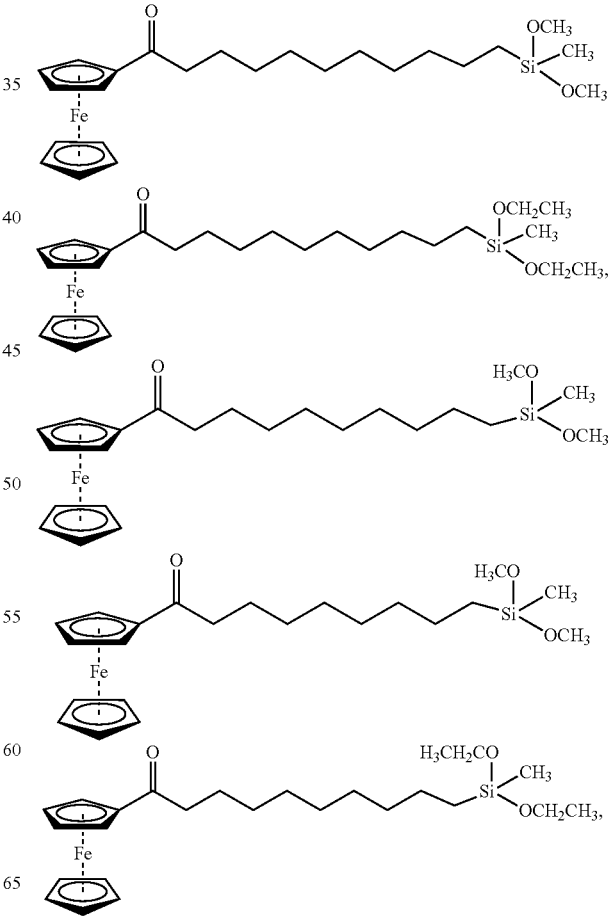

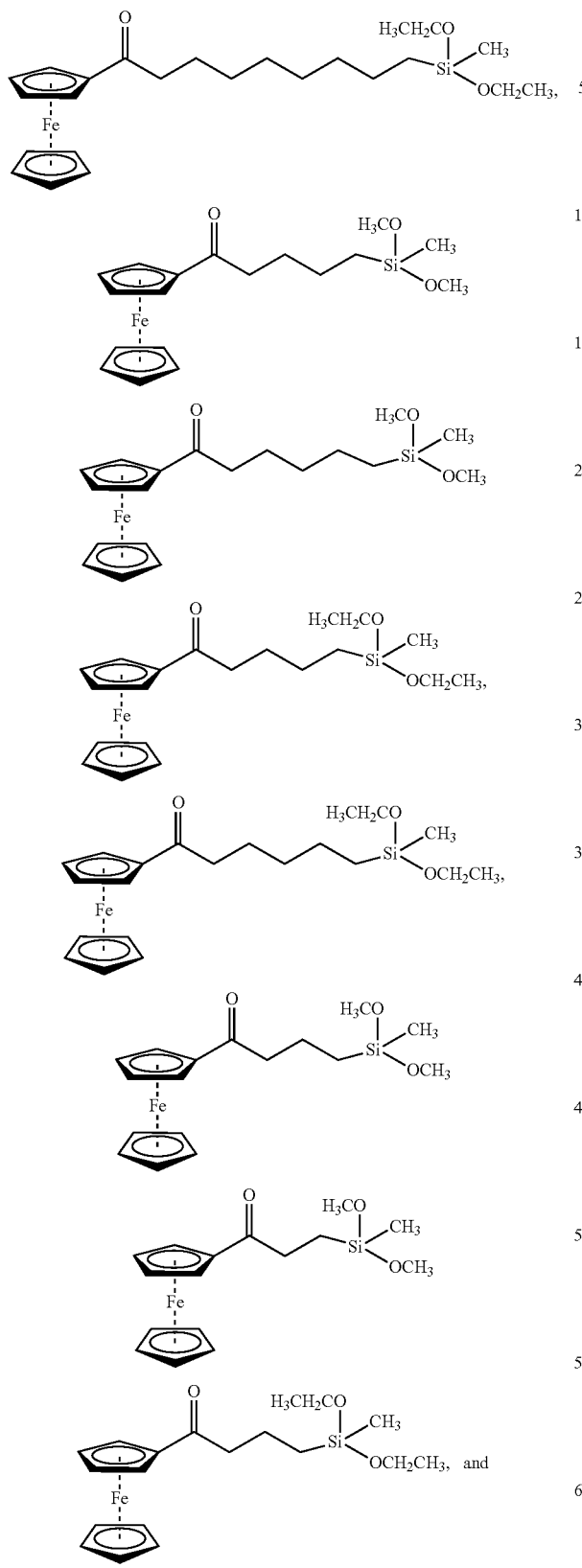

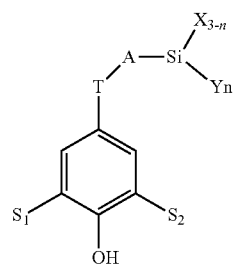

13. The dielectric enhancement fluid of claim 12, wherein the compound is 11-(dimethoxymethylsilyl)-1-oxo-undecyl-1-ferrocene (AcylFc-DMS), or 3-(dimethoxymethylsilyl)-1-oxo-propyl-1-ferrocene.

14. The dielectric enhancement fluid of claim 7, wherein for (5), the at least one silane functional additive is selected from:
(i) a hindered phenolic antioxidant of formula (XIX) or (XIXa):

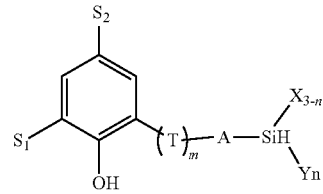

wherein:
S1 and S2 can be equal or different C1-C10 branched alkyl;
m is zero or one;
T is oxygen or sulfur;
A is a C1-C10 linear or branched alkylene, or

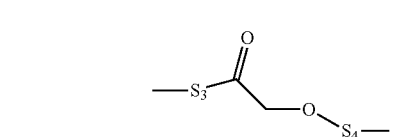

wherein S3, S4, and S5 are C3-C10 linear or branched alkylene;
X is a C1-C5 linear or branched alkyl;
Y is hydrogen, halogen, C1-C4 acyloxy, C1-C4 alkyloxy, amino, amino-oxy, or silyloxy; and
n is one, two, or three;

(ii) a hindered amine light stabilizer of formula (XI):

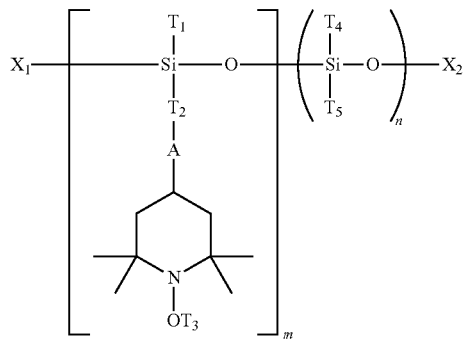

(XI)

wherein:

m+n is a number from 1 to 40, n varies from zero to 50% of the sum m+n;

A is —O—;

T1 and T4 which can be identical or different are methyl, methoxy, ethoxy, or OH;

T2 is trimethylene or is also a direct bond if A is —O— and T1 and T4 are methyl;

T3 is methyl, C7-C9 alkyl, or cyclohexyl;

T5 is C1-C12 alkyl;

X1 is as defined for T1 or is a group (CH3)3 SiO—; and

X2 is hydrogen, methyl, ethyl, a group (CH3)3 Si— or, if n is zero and T1 and X1 are methyl, X2 is also a group of the formula (XIII)

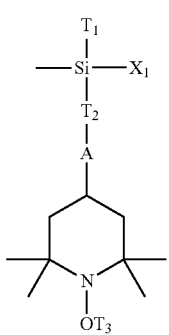

(XIII)

and, if m+n is a number from 3 to 10, X1 and X2 together can also be a direct bond; and/or (iii) a UV absorber or energy quencher of formula (IA) or (IIA):

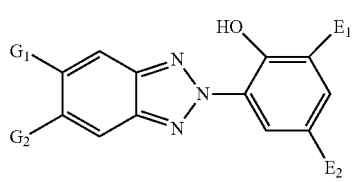

(IA)

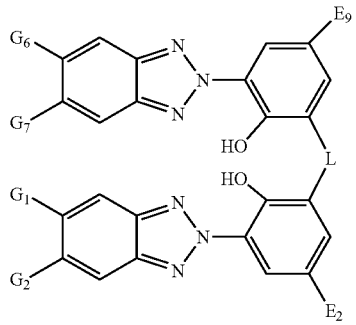

(IIA)

wherein:

G1 and G6 are hydrogen;

G2 and G7 are independently H, cyano, CF3-, fluoro, —CO-G3, or E3SO2-;

G3 is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;

E1 is phenylalkyl of 7 to 15 carbon atoms, phenyl, or said phenyl or said phenylalkyl substituted on the phenyl ring by 1 to 4 alkyl groups of 1 to 4 carbon atoms each;

E2 and E9 are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or E2 is said alkyl of 1 to 24 carbon atoms or said alkenyl of 2 to 18 carbon atoms substituted by one or more —OH, —OCOE11, —OE4, —NCO, —NH2, —NHCOE11, —NHE4, or —N(E4)2, or mixtures thereof, where E4 is straight or branched chain alkyl of 1 to 24 carbon atoms; or said alkyl or said alkenyl interrupted by one or more —O—, —NH—, or —NE4- groups or mixtures thereof and which can be unsubstituted or substituted by one or more —OH, —OE4, or —NH2 groups or mixtures thereof;

E11 is hydrogen, straight or branched chain alkyl of 1 to 18 carbon atoms, straight or branched chain alkenyl of 2 to 18 carbon atoms, cycloalkyl of 5 to 12 carbon atoms, aryl of 6 to 14 carbon atoms, or phenylalkyl of 7 to 15 carbon atoms;

E3 is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms, or said aryl substituted by one or two alkyls of 1 to 4 carbon atoms or 1,1,2,2-tetrahydroperfluoroalkyl where the perfluoroalkyl moiety is of 6 to 16 carbon atoms;

L is methylene; and with the proviso that at least one of E1, E2, and E9 contains a group -T1-Si(OR2)n(R1)3-n, -T1-X—CO—X-T2-Si(OR2)n(R1)3-n, -T1-CO—X-T2-Si(OR2)n(R1)3-n, —X-T1-Si(OR2)n(R1)3-n, or —X-T1-X—CO—X-T2-Si(OR2)n(R1)3-n;

where, for E1, E2, and E9, T1 and T2 are independently alkylene of 2 or 3 carbon atoms, R1 and R2 are independently alkyl of 1 to 6 carbon atoms or phenyl, n is 1, 2, or 3, and X is —O—, —NE4—, or —NH—.

15. A hydrosilylation gel, comprising:
(A) an acyl metallocene compound of formula (1):

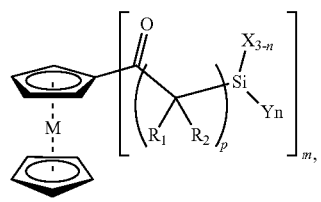
(1)

M is a metal ion selected from Fe(II), Mn(II), Ni(II), Co(II), Ru(II), or Os(II);
m is 1-4, where a silane acyl group(s) can be at any position(s) on one or both of the cyclopentadienyl rings;
p can vary from 2 to 20 carbon atoms;
R1 and R2 are C1-C4 linear or branched alkyl, or H;
X is a C1-C5 linear or branched alkyl;
Y is C1-C4 acyloxy, C1-C4 alkyloxy, or silyloxy; and
wherein for m=1, n is two or three, and for m=2-4, n is one, two, or three; and
(B) at least one component selected from:
(a) an Si—H endblocked polydiorganosiloxane fluid with the formula H(R2SiO)x(R2Si)H, wherein R is independently selected from alkyl radicals having from 1 to 6 carbon atoms or the phenyl radical and the average value of x is 1 to 40, and having a viscosity of 0.5 to about 100 centistokes at 25° C.,
(b) a polydiorganosiloxane fluid endblocked with groups containing unsaturated carbon-carbon functionality and having a viscosity of 0.5 to about 100 centistokes at 25° C.,
(c) a hydrosilylation catalyst suitable to cure the mixture of parts (a) and (b), and
(d) at least one organoalkoxysilane functional additive selected from the group consisting of:
(i) a hindered phenolic antioxidant based on 2,6-di-tert-butyl phenol,
(ii) a hindered amine light stabilizer, based on tetramethyl piperidine, and/or
(iii) a UV absorber or energy quencher selected from benzotriazoles, triazines, benzophenones, and/or nickel chelates.

16. The hydrosilylation gel of claim 15, wherein for formula (1): M is Fe(II).

17. The hydrosilylation gel of claim 16, wherein for formula (1): M is Fe(II); m is 1-2; R1 and R2 are C1-C2 alkyl or H; X is C1-C2 alkyl; and Y is C1-C4 alkyloxy.

18. The hydrosilylation gel of claim 17, wherein for formula (1): M is Fe(II); m is 1; R1 and R2 are H; X is —CH3; and Y is C1-C2 alkyloxy.

19. The hydrosilylation gel of claim 18, wherein for formula (1) the compound is selected from the group consisting of:

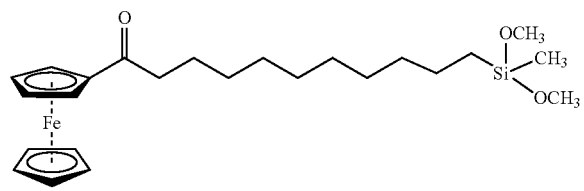

-continued

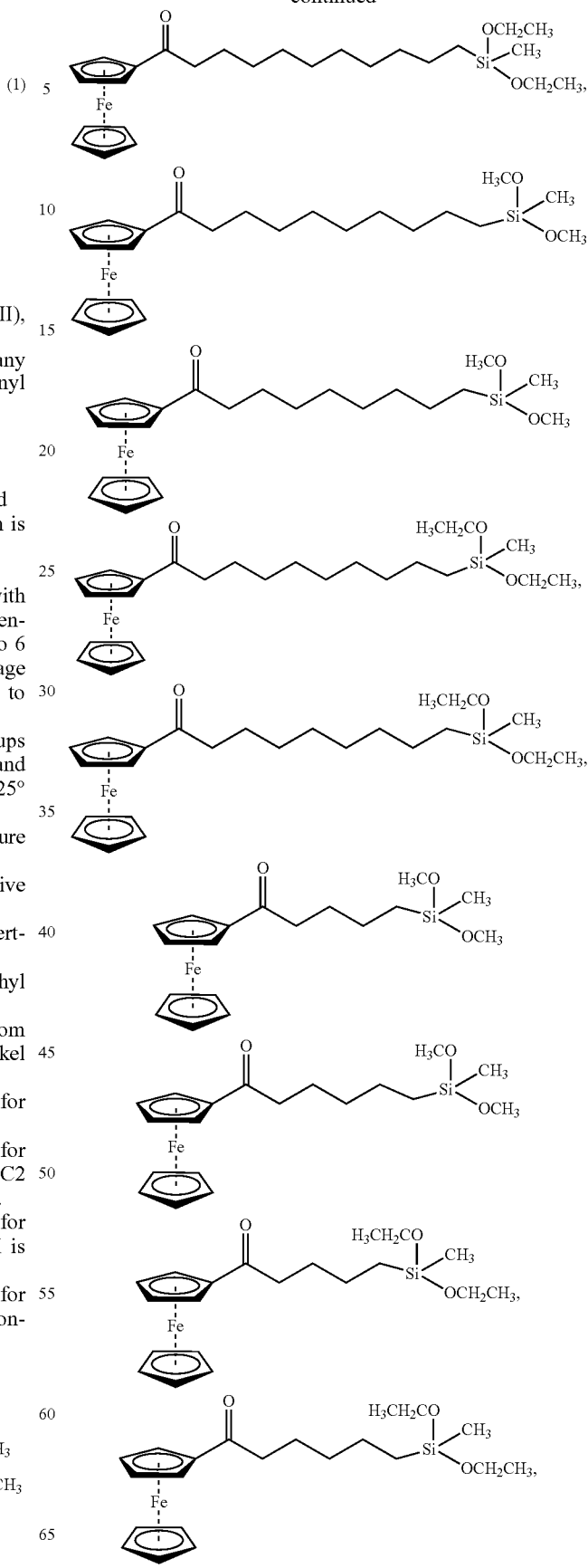

-continued

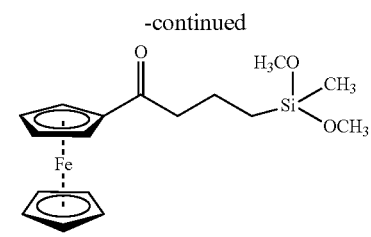

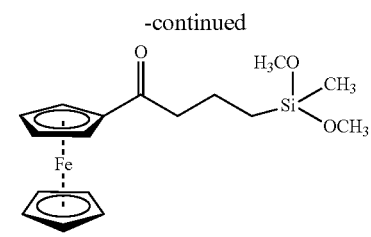

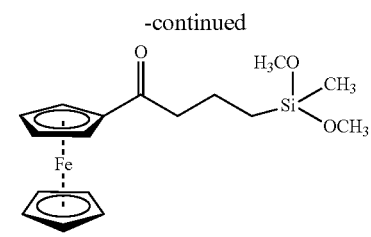

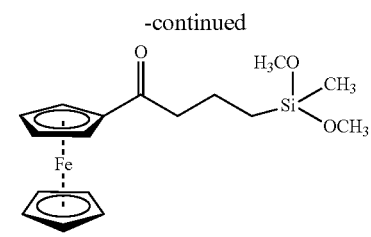

20. The hydrosilylation gel of claim 19, wherein the compound is 11-(dimethoxymethylsilyl)-1-oxo-undecyl-1-ferrocene (AcylFc-DMS), or 3-(dimethoxymethylsilyl)-1-oxo-propyl-1-ferrocene.

21. The hydrosilylation gel of claim 15, wherein for (d), the at least one organoalkoxysilane functional additive is selected from:

(i) a hindered phenolic antioxidant of formula (XIX) or (XIXa):

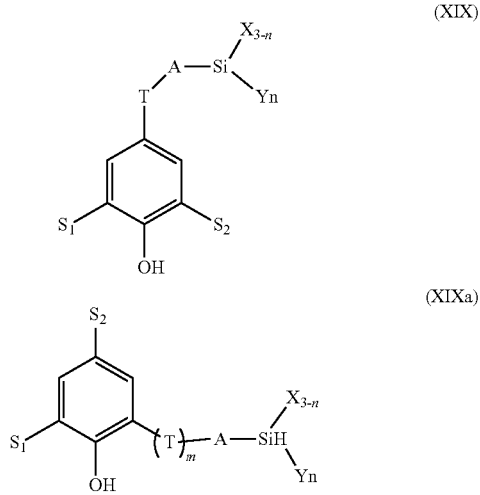

wherein:

S1 and S2 can be equal or different C1-C10 branched alkyl;

m is zero or one;

T is oxygen or sulfur;

A is a C1-C10 linear or branched alkylene, or

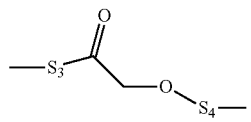

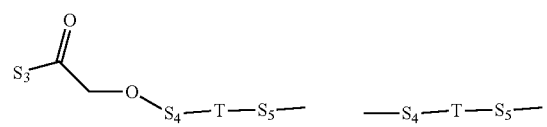

wherein S3, S4, and S5 are C3-C10 linear or branched alkylene;

X is a C1-C5 linear or branched alkyl;

Y is hydrogen, halogen, C1-C4 acyloxy, C1-C4 alkyloxy, amino, amino-oxy, or silyloxy; and n is one, two or three;

(ii) a hindered amine light stabilizer of formula (XI):

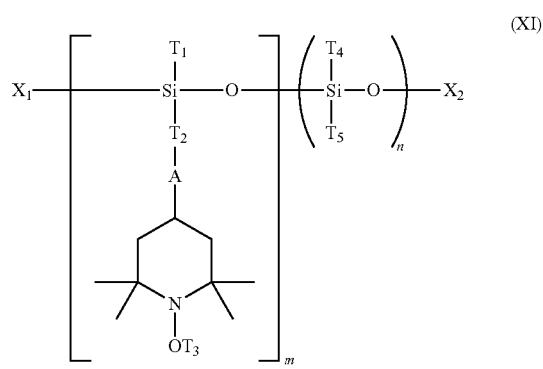

wherein:

m+n is a number from 1 to 40, n varies from zero to 50% of the sum m+n;

A is —O—;

T1 and T4 which can be identical or different are methyl, methoxy, ethoxy, or OH;

T2 is trimethylene or is also a direct bond if A is —O— and T1 and T4 are methyl;

T3 is methyl, C7-C9 alkyl, or cyclohexyl;

T5 is C1-C12 alkyl;

X1 is as defined for T1 or is a group (CH3)3 SiO—; and

X2 is hydrogen, methyl, ethyl, a group (CH3)3 Si— or, if n is zero and T1 and X1 are methyl, X2 is also a group of the formula (XIII)

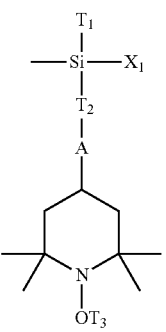

(XIII)

and, if m+n is a number from 3 to 10, X1 and X2 together can also be a direct bond; and/or (iii) a UV absorber or energy quencher of formula (IA) or (IIA):

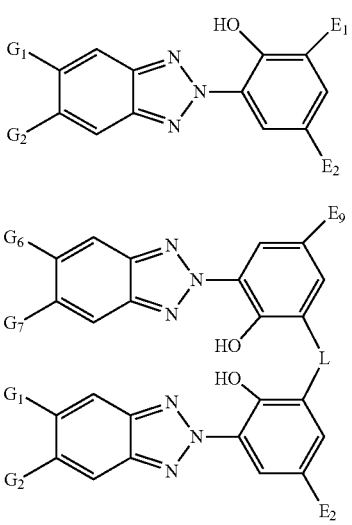

wherein:

G1 and G6 are hydrogen;

G2 and G7 are independently H, cyano, CF3-, fluoro, —CO-G3, or E3SO2-;

G3 is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;

E1 is phenylalkyl of 7 to 15 carbon atoms, phenyl, or said phenyl or said phenylalkyl substituted on the phenyl ring by 1 to 4 alkyl groups of 1 to 4 carbon atoms each;

E2 and E9 are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or E2 is said alkyl of 1 to 24 carbon atoms or said alkenyl of 2 to 18 carbon atoms substituted by one or more —OH, —OCOE11, —OE4, —NCO, —NH2, —NHCOE11, —NHE4, or —N(E4)2, or mixtures thereof, where E4 is straight or branched chain alkyl of 1 to 24 carbon atoms; or said alkyl or said alkenyl interrupted by one or more —O—, —NH—, or —NE4- groups or mixtures thereof and which can be unsubstituted or substituted by one or more —OH, —OE4, or —NH2 groups or mixtures thereof;

E11 is hydrogen, straight or branched chain alkyl of 1 to 18 carbon atoms, straight or branched chain alkenyl of 2 to 18 carbon atoms, cycloalkyl of 5 to 12 carbon atoms, aryl of 6 to 14 carbon atoms, or phenylalkyl of 7 to 15 carbon atoms;

E3 is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms, or said aryl substituted by one or two alkyls of 1 to 4 carbon atoms or 1,1,2,2-tetrahydroperfluoroalkyl where the perfluoroalkyl moiety is of 6 to 16 carbon atoms;

L is methylene; and with the proviso that at least one of E1, E2, and E9 contains a group -T1-Si(OR2)n(R1)3-n, -T1-X—CO—X-T2-Si(OR2)n(R1)3-n, -T1-CO—X-T2-Si(OR2)n(R1)3-n, —X-T1-Si(OR2)n(R1)3-n, or —X-T1-X—CO—X-T2-Si(OR2)n(R1)3-n;

where, for E1, E2, and E9, T1 and T2 are independently alkylene of 2 or 3 carbon atoms, R1 and R2 are independently alkyl of 1 to 6 carbon atoms or phenyl, n is 1, 2, or 3, and X is —O—, —NE4—, or —NH—.

22. A method for extending the useful life of an insulated cable, comprising injecting, into a cable having a stranded conductor encased in a polymeric insulation jacket, a dielectric enhancement fluid comprising an acyl metallocene compound of formula (1) according to claim 7, or a dielectric gel formulation comprising an acyl metallocene compound of formula (1) according to claim 15, and wherein the acyl metallocene compound of formula (1) diffuses into the polymeric insulation.

23. A method for extending the useful life of in-service electrical cable, comprising injecting a dielectric enhancement fluid composition according to claim 7, into at least one section of an electrical cable having a stranded conductor encased in a polymeric insulation jacket, and having an average operating temperature T, and wherein the injected composition provides for both initial permeation of the acyl metallocene compound of formula (1) into the polymeric insulation, and extended retention of subsequent condensation products of the acyl metallocene compound of formula (1) in the cable insulation.

24. A method for extending the useful life of an insulated cable, comprising injecting, into a cable having a stranded conductor encased in a polymeric insulation jacket, a dielectric gel formulation according to claim 15, and wherein, after injection, the mixture of parts (a) and (b) is cured into a non-flowable gel in the cable, and wherein the acyl metallocene compound of formula (1) diffuses into the polymeric insulation.

* * * * *